(12) United States Patent
Kim et al.

(10) Patent No.: US 11,469,499 B2
(45) Date of Patent: Oct. 11, 2022

(54) APPARATUS AND METHOD FOR PHASE SHIFTING

(71) Applicant: SAMSUNG ELECTRONICS CO., LTD., Suwon-si (KR)

(72) Inventors: Yoongeon Kim, Suwon-si (KR); Seungho Choi, Suwon-si (KR); Seungtae Ko, Suwon-si (KR); Youngsub Kim, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/124,926

(22) Filed: Dec. 17, 2020

(65) Prior Publication Data

US 2021/0194124 A1  Jun. 24, 2021

(30) Foreign Application Priority Data

Dec. 23, 2019 (KR) .................. 10-2019-0173352

(51) Int. Cl.
*H01Q 3/36* (2006.01)
*H01Q 21/06* (2006.01)
(Continued)

(52) U.S. Cl.
CPC .............. *H01Q 3/36* (2013.01); *H01Q 3/38* (2013.01); *H01Q 15/002* (2013.01); *H01Q 21/06* (2013.01); *H01Q 21/08* (2013.01)

(58) Field of Classification Search
CPC .......... H01Q 3/36; H01Q 21/06; H01Q 21/08; H01Q 1/246; H01Q 3/30; H01Q 5/335;
(Continued)

(56) References Cited

U.S. PATENT DOCUMENTS 4,041,501 A * 8/1977 Frazita ............... H01Q 3/40
                                                342/373
6,943,745 B2 * 9/2005 Rao .................. H01Q 1/288
                                                343/757
(Continued)

FOREIGN PATENT DOCUMENTS

CN      107611570 A  *  1/2018
KR      10-1494956       2/2015
(Continued)

OTHER PUBLICATIONS

International Search Report and Written Opinion dated Apr. 16, 2021 in corresponding International Application No. PCT/KR2020/018467.

*Primary Examiner* — Vibol Tan
(74) *Attorney, Agent, or Firm* — Nixon & Vanderhye P.C.

(57) ABSTRACT

The present disclosure relates to a pre-$5^{th}$-Generation (5G) or 5G communication system to be provided for supporting higher data rates Beyond $4^{th}$-Generation (4G) communication system such as long term evolution (LTE). According to various embodiments, an antenna apparatus may include: an array antenna including a sub-array, a power divider, and a reconfigurable phase shifter circuit, the reconfigurable phase shifter circuit may be configured to provide a first phase shift value based on a switch in a first state, and provide a second phase shift value different from the first phase shift value based on the switch in a second state.

17 Claims, 22 Drawing Sheets

(51) Int. Cl.
*H01Q 21/08* (2006.01)
*H01Q 15/00* (2006.01)
*H01Q 3/38* (2006.01)

(58) Field of Classification Search
CPC .. H04B 7/0617; H04B 7/0695; H04B 7/0413; H04B 7/0682
See application file for complete search history.

(56) References Cited

U.S. PATENT DOCUMENTS

| | | | |
|---|---|---|---|
| 9,300,056 | B2 | 3/2016 | Lee et al. |
| 10,530,448 | B1 * | 1/2020 | Tran ..................... H04B 7/0617 |
| 10,608,678 | B1 * | 3/2020 | Hormis .............. H04B 7/15528 |
| 10,714,836 | B1 * | 7/2020 | Karabacak ........... H04B 7/0868 |
| 10,827,364 | B2 * | 11/2020 | Shi ......................... H01Q 1/246 |
| 11,211,704 | B2 * | 12/2021 | Rostomyan .............. H01Q 3/36 |
| 2009/0195361 | A1 | 8/2009 | Smith |
| 2014/0152385 | A1 | 6/2014 | Ehyaie et al. |
| 2019/0103672 | A1 | 4/2019 | Jackson et al. |
| 2019/0296802 | A1 | 9/2019 | Fang |

FOREIGN PATENT DOCUMENTS

| | | | | |
|---|---|---|---|---|
| KR | 10-1772206 | | 8/2017 | |
| KR | 10-1809383 | | 12/2017 | |
| WO | WO-2018115896 | A2 * | 6/2018 | ........... B81B 7/0064 |
| WO | WO-2019120513 | A1 * | 6/2019 | |

* cited by examiner (501)

(503)

(505)

APPARATUS AND METHOD FOR PHASE SHIFTING

CROSS-REFERENCE TO RELATED APPLICATION

This application is based on and claims priority under 35 U.S.C. § 119 to Korean Patent Application No. 10-2019-0173352, filed on Dec. 23, 2019, in the Korean Intellectual Property Office, the disclosure of which is incorporated by reference herein in its entirety.

BACKGROUND

Field

The disclosure relates to an antenna, and for example, relates to a design and an operating method of a phase shifter circuit of the antenna, and an apparatus including the same.

Description of Related Art

To meet the demand for wireless data traffic having increased since deployment of 4G communication systems, efforts have been made to develop an improved 5G or pre-5G communication system. Therefore, the 5G or pre-5G communication system may also be referred to as a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Beamforming technology is used as one of techniques for mitigating the propagation path loss and increasing the propagation distance. The beamforming, in general, focuses propagation coverage using a plurality of antennas, or increases directivity of reception for a specific direction. To operate the beamforming, a communication node may include a plurality of antennas.

SUMMARY

Embodiments of the disclosure address the above-discussed deficiencies of the prior art and provide a phase shifter circuit applied to an array antenna in a wireless communication system.

Embodiments of the disclosure provide a power divider and a phase shifter circuit connected to a sub-array in a wireless communication system.

Embodiments of the disclosure provide an apparatus and a method for designing and operating a phase shifter circuit which performs various phase shifts in a wireless communication system.

Embodiments for the disclosure provide an apparatus and a design method of a phase shifter circuit for minimizing and/or reducing a switching loss in a wireless communication system.

According to various example embodiments of the disclosure, an antenna apparatus may include: an array antenna including a sub-array, a power divider, and a reconfigurable phase shifter circuit, and the reconfigurable phase shifter circuit may be configured to: provide a first phase shift value based on a switch, in a first state, and provide a second phase shift value different from the first phase shift value based on the switch, in a second state.

According to various example embodiments of the disclosure, an apparatus may include: a processor, an array antenna including a sub-array, a power divider, and a reconfigurable phase shifter circuit, and the processor may be configured to control the array antenna to: radiate a first signal based on a first phase shift of the reconfigurable phase shifter circuit and a passive phase shift of the power divider, and radiate a second signal based on a second phase shift of the reconfigurable phase shifter circuit and a passive phase shift of the power divider, the first phase shift value and the second phase shift value of the reconfigurable phase shifter circuit may be configured wherein a boresight of the first signal does not overlap a boresight of the second signal.

According to various example embodiments of the disclosure, a method of designing an antenna apparatus including a phase shifter circuit in which a main path and at least two sub paths are connected in parallel, and a sub-array may include: setting variables of the main path, setting variables of the at least two sub paths, identifying first values corresponding to the variables of the main path and second values corresponding to the variables of the at least two sub paths based on three conditions, and configuring the main path and the at least two sub paths based on the identified first values and second values, wherein the three conditions may include a first condition in which a reflection coefficient is 0 if the main path and the at least two sub paths are connected in parallel, a second condition in which a transmission coefficient is 1 if the main path and the at least two sub paths are connected in parallel, and a third condition in which a difference of a first phase vector provided based on the main path and a first sub path of the at least two sub paths being connected and a second phase vector provided based on the main path and a second sub path of the at least two sub paths being connected is a designated phase offset.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Figure 1:
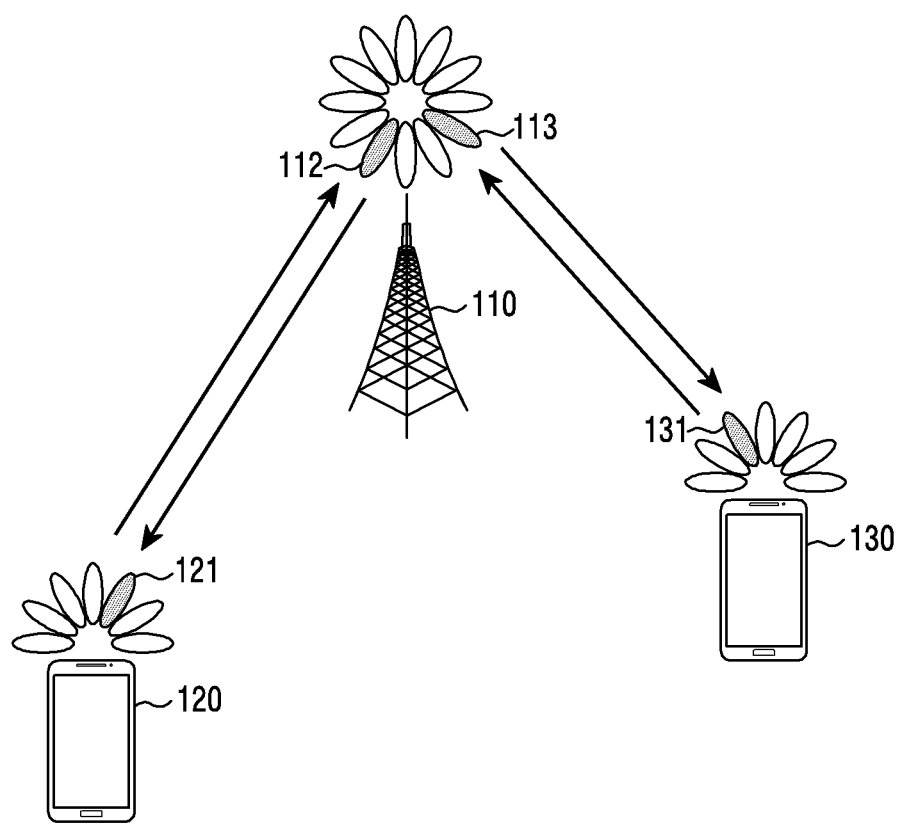
FIG. 1 is a diagram illustrating an example wireless communication system according to various embodiments.

The terms used in the disclosure are used to describe various embodiments, and are not intended to limit the scope of the disclosure. The expression of a singular form may include the expression of a plural form unless they are clearly different in context. The terms used herein including the technological or scientific terms may have the same meanings as those generally understood by a person having ordinary skill in the art mentioned in the disclosure. Among the terms used in the disclosure, the terms defined in a general dictionary may be interpreted as the same or similar meanings as the contextual meanings of a related technology, and are not interpreted as ideal or excessively formal meanings unless defined clearly in the disclosure. In some cases, even the terms defined in the disclosure should not be construed as excluding embodiments of the disclosure.

In various example embodiments of the disclosure to be described hereinafter, a hardware-based approach will be described as an example. However, various embodiments of the disclosure include technology which uses both hardware and software, and thus do not exclude a software-based approach.

The disclosure relates generally to an apparatus and a method for managing beam coverage in a wireless communication system. For example, the disclosure describes a technique for, if a radio frequency (RF) path does not operate normally in the wireless communication system, restoring a beam pattern to build beam coverage substantially similar to existing beam coverage.

Terms (a signal, a symbol, a stream, data, a beamforming signal) indicating signals, terms (a multi-beam, a plurality of beams, a single beam, a dual beam, a quad-beam, beamforming) related to beams, terms (an antenna array, an antenna element, a communication unit, an antenna) indicating components of an apparatus, and terms (e.g., a communication node, a radio node, a radio unit, a network node, a transmission/reception point (TRP)) indicating network entities are used for ease of explanation. Accordingly, the disclosure is not limited to the terms to be described, and may use other terms having technically identical or similar meaning.

A metric for a signal gain or a signal quality in the following explanations may include at least one of, for example, beam reference signal received power (BRSRP), reference signal received power (RSRP), reference signal received quality (RSRQ), received signal strength indicator (RSSI), signal to interference and noise ratio (SINR), carrier to interference and noise ratio (CINR), SNR, error vector magnitude (EVM), bit error rate (BER), and block error rate (BLER). It will be understood that other terms having the equivalent technical meaning or other metrics indicating the channel quality may be used.

In this disclosure, to determine whether a specific condition is satisfied or fulfilled, expressions such as "greater than" or "less than" may be used by way of example and expressions such as "greater than or equal to" or "less than or equal to" are also applicable and not excluded. A condition defined with "greater than or equal to" may be replaced by "greater than" (or vice-versa), a condition defined with "less than or equal to" may be replaced by "less than" (or vice-versa), etc.

The disclosure provides various example embodiments using terms used in various communication standards (e.g., $3^{rd}$ generation partnership project (3GPP)) by way of example. Various example embodiments of the disclosure may be easily used in other communication systems.

FIG. 1 is a diagram illustrating an example wireless communication system according to various embodiments of the disclosure. FIG. 1 depicts a base station 110, a terminal 120, and a terminal 130, as some of nodes which use a radio channel in the wireless communication system. While FIG. 1 depicts only one base station, other base stations identical or similar to the base station 110 may be further included.

The base station 110 may include a network infrastructure for providing radio access to the terminals 120 and 130. The base station 110 may have a coverage area defined as a specific geographical area based on a signal transmission distance. The base station 110 may be referred to, for example, as, an 'access point (AP)', an 'eNodeB (eNB)', a '5th generation node (5G node)', a 'network generation nodeB (gNB)', a 'wireless point', a 'transmission/reception point (TRP)', or other terms having a similar or equivalent technical meaning.

The terminal 120 and the terminal 130 each may include a device used by a user, and communicate with the base station 110 over a radio channel. A link from the base station 110 to the terminal 120 or the terminal 130 may be referred to as a downlink (DL), and a link from the terminal 120 or the terminal 130 to the base station 110 may be referred to as an uplink (UL). The terminal 120 and the terminal 130 may communicate with each other over a radio channel. In some cases, at least one of the terminal 120 and the terminal 130 may operate without user's involvement. For example, at least one of the terminal 120 and the terminal 130 is a device which performs machine type communication (MTC), and may not be carried by the user. The terminal 120 and the terminal 130 each may be referred to as, a 'user equipment (UE)', a 'customer premises equipment (CPE)', a 'mobile station', a 'subscriber station', a 'remote terminal', a 'wireless terminal', an 'electronic device' or a 'user device', or other term having a technically equivalent meaning.

Figure 2:
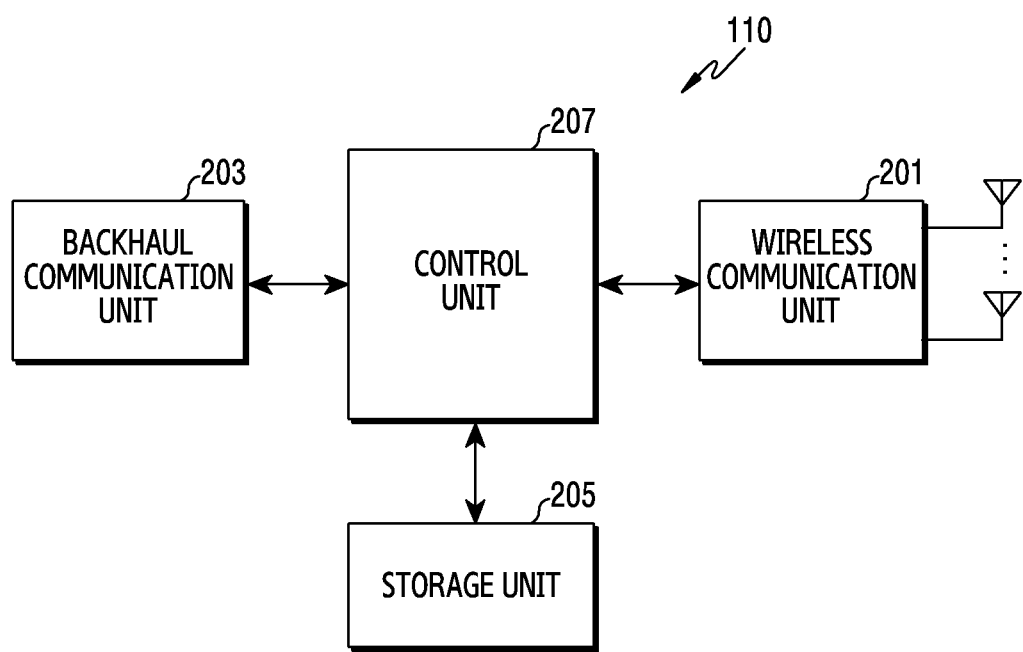
FIG. 2 is a block diagram illustrating an example configuration of a base station according to various embodiments.

FIG. 2 is a block diagram illustrating an example configuration of a base station in a wireless communication system according to various embodiments of the disclosure. The configuration in FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station 110 includes a wireless communication unit (e.g., including wireless communication circuitry) 201, a backhaul communication unit (e.g., including backhaul circuitry) 203, a storage unit 205, and a control unit (e.g., including processing circuitry) 207.

The wireless communication unit 201 may include various communication circuitry and perform functions for transmitting and receiving signals over a radio channel. For example, the wireless communication unit 201 may perform a conversion function between a baseband signal and a bit string according to a physical layer standard of the system. For example, in data transmission, the wireless communication unit 201 may generate complex symbols by encoding and modulating a transmit bit string. Also, in data reception, the wireless communication unit 201 may restore a received bit string by demodulating and decoding a baseband signal. Also, the wireless communication unit 201 may up-convert the baseband signal to an RF band signal, transmit it via an antenna, and down-convert an RF band signal received via an antenna to a baseband signal.

For doing so, the wireless communication unit 201 may include a transmit filter, a receive filter, an amplifier, a mixer, an oscillator, a digital to analog convertor (DAC), an analog to digital convertor (ADC), and so on. In addition, the wireless communication unit 201 may include a plurality of transmit and receive paths. Further, the wireless communication unit 201 may include at least one antenna array including a plurality of antenna elements. In terms of the hardware, the wireless communication unit 201 may include a digital unit and an analog unit, and the analog unit may include a plurality of sub-units according to an operating power and an operating frequency. According to various embodiments, the wireless communication unit 201 may include a unit for forming a beam, for example, a beamforming unit. For example, the wireless communication unit 201 may include a massive multiple input multiple output (MIMO) unit (MMU) for the beamforming.

The wireless communication unit 201 may transmit or receive the signal. For doing so, the wireless communication unit 201 may include at least one transceiver. For example, the wireless communication unit 201 may transmit a synchronization signal (SS), a reference signal (RS), system information, a message, control information, data, or the like. Also, the wireless communication unit 201 may perform the beamforming. Further, to give directivity based on a configuration of the control unit 207 to the signal to transmit or to receive, the wireless communication unit 201 may apply a beamforming weight to the signal.

The wireless communication unit 201 may transmit and receive the signals as stated above. Hence, whole or part of the wireless communication unit 201 may be referred to as 'a transmitter', 'a receiver', or 'a transceiver'. Also, in the following, the transmission and the reception over the radio channel is used as the meaning which embraces the above-stated processing of the wireless communication unit 201.

The backhaul communication unit 203 may include various backhaul circuitry and provides an interface for communicating with other nodes in the network. For example, the backhaul communication unit 203 may convert a bit sting transmitted from the base station 110 to other node, for example, to other access node, another base station, an upper node, or a core network, to a physical signal, and converts a physical signal received from the other node to a bit string.

The storage unit 205 may store a basic program for operating the base station 110, an application program, and data such as setting information. The storage unit 205 may include a memory. The storage unit 205 may include a volatile memory, a non-volatile memory, or a combination of a volatile memory and a non-volatile memory. The storage unit 205 provides the stored data at a request of the control unit 207. According to an embodiment, the storage unit 205 may store a type of a phase shifter circuit. Depending on a phase offset range, the phase shifter circuit of a required type may be used.

The control unit 207 may include various processing circuitry and controls general operations of the base station 110. For example, the control unit 207 transmits and receives signals through the wireless communication unit 201 or the backhaul communication unit 203. Also, the control unit 207 records and reads data in and from the storage unit 205. The control unit 207 may execute functions of a protocol stack requested by a communication standard. For doing so, the control unit 207 may include at least one processor.

The configuration of the base station 110 in FIG. 2 is only an example of the base station, and accordingly the example of the base station for various embodiments of the disclosure is not limited to the configuration of FIG. 2. According to various embodiments, some component may be added, deleted, or modified.

The base station has been described as, but not limited to, the single entity in FIG. 2. The base station according to various embodiments of the disclosure may be implemented to build an access network having a distributed deployment as well as the integrated deployment. According to an embodiment, the base station may be divided into a central unit (CU) and a digital unit (DU), the CU may be configured to perform functions of upper layers (e.g., packet data convergence protocol (PDCP)), and the DU may be configured to perform functions of lower layers (e.g., medium access control (MAC), physical (PHY)). The phase shifter circuit for forming the beam coverage according to various embodiments may be implemented on the DU of the base station. According to an embodiment, the base station may include a digital unit (DU) and a radio unit (RU), the DU may perform functions such as baseband processing, and the phase shifter circuit for forming the beam coverage according to various embodiments may be implemented on the RU of the base station.

Figure 3:
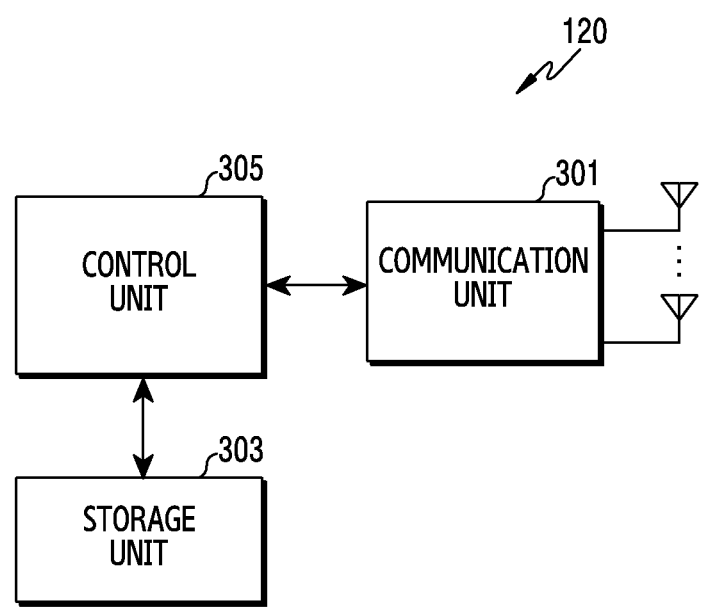
FIG. 3 is a block diagram illustrating an example configuration of a terminal according to various embodiments.

FIG. 3 is a block diagram illustrating an example configuration of a terminal in a wireless communication system according to various embodiments of the disclosure. The configuration illustrated in FIG. 3 may be understood as the configuration of the terminal 120. A term such as 'portion' or '~er' used hereafter indicates a unit for processing at least one function or operation, and may be implemented using hardware, software, or a combination of hardware and software.

Referring to FIG. 3, the terminal 120 includes a communication unit (e.g., including communication circuitry) 301, a storage unit 303, and a control unit (e.g., including processing circuitry) 305.

The communication unit 301 may include various communication circuitry and perform functions for transmitting and receiving signals over the radio channel. For example, the communication unit 301 performs a conversion function between a baseband signal and a bit string according to a physical layer standard of the system. For example, in data transmission, the communication unit 301 generates complex symbols by encoding and modulating a transmit bit string. Also, in data reception, the communication unit 301 restores a receive bit string by demodulating and decoding a baseband signal. Also, the communication unit 301 up-converts the baseband signal to an RF band signal, transmits it via an antenna, and down-converts an RF band signal received via the antenna to a baseband signal. For example, the communication unit 301 may include a transmit filter, a receive filter, an amplifier, a mixer, an oscillator, a DAC, an ADC, and the like.

The communication unit 301 may include a plurality of transmit and receive paths. Further, the communication unit 301 may include an antenna unit. The communication unit 301 may include at least one antenna array including a plurality of antenna elements. In view of the hardware, the wireless communication unit 301 may include a digital circuit and an analog circuit (e.g., an RF integrated circuit (RFIC)). The digital circuit and the analog circuit may be implemented as a single package. Also, the communication unit 301 may include a plurality of RF chains. The communication unit 301 may perform the beamforming. To give the directivity according to the configuration of the control unit 305 to the signal to transmit or to receive, the communication unit 301 may apply a beamforming weight to the signal.

In addition, the communication unit 301 may transmit and receive a signal. For doing so, the communication unit 301 may include at least one transceiver. The communication unit 301 may receive a DL signal. In addition, the communication unit 301 may transmit an UL signal. The communication unit 301 may include different communication modules to process signals of different frequency bands. Further, the communication unit 301 may include a plurality of communication modules including various communication circuitry to support a plurality of different radio access technologies. For example, different wireless access technologies may include Bluetooth low energy (BLE), wireless fidelity (Wi-Fi), Wi-Fi gigabyte (WiGig), a cellular network (e.g., long term evolution (LIE), new radio (NR)), and so on. In addition, different frequency bands may include a super high frequency (SHF) 2.5 GHz, 5 GHz) band, a millimeter wave (e.g., 38 GHz, 50 GHz, etc.) band. In addition, the communication unit 301 may use the wireless access technology of the same type on different frequency bands (e.g., an unlicensed band for licensed assisted access (LAA), broadband radio service (CBRS) (e.g., 3.5 GHz)).

The communication unit 301 transmits and receives the signals as stated above. Whole or part of the communication unit 301 may be referred to as 'a transmitter', 'a receiver', or 'a transceiver'. In addition, the transmission and the reception over the radio channel are used as the meaning which embraces the above-stated processing of the communication unit 301 in the following explanations.

The storage unit 303 stores a basic program for operating the terminal 120, an application program, and data such as setting information. The storage unit 303 may include a volatile memory, a non-volatile memory, or a combination of a volatile memory and a non-volatile memory. The storage unit 303 provides the stored data according to a request of the control unit 305.

The control unit 305 may include various processing circuitry and controls general operations of the terminal 120. For example, the control unit 305 transmits and receives the signals through the communication unit 301. The control unit 305 records and reads data in and from the storage unit 303. The control unit 305 may execute functions of a protocol stack required by a communication standard. For doing so, the control unit 305 may include at least one processor. The control unit 305 may include at least one processor or microprocessor, or may be part of a processor. In addition, part of the communication unit 301 and the control unit 305 may be referred to as a communication processor (CP). The control unit 305 may include various modules for the communication. According to various embodiments, the control unit 305 may control the terminal to carry out operations according to various embodiments to be described.

Beamforming technology may be used as one of techniques for mitigating a propagation path loss and increasing a propagation distance. Beamforming, in general, focuses propagation coverage using a plurality of antennas, or increases directivity of reception for a specific direction. The communication node may include a plurality of antennas, to build the beamforming coverage rather than generating a signal in an isotropic pattern using a single antenna. The communication node according to various embodiments may include an MMU. The antennas may be referred to as an antenna array, and each antenna in the array may be referred to as an array antenna or an antenna element. The antenna array may be configured in various types such as a linear array and a planar array. The antenna array may be referred to as a massive antenna array. The disclosure describes the antenna array as a plurality of antennas for communication in a MIMO environment, and it is noted that modifications for the beamforming may be easily made in various embodiments. In addition, to build the beamforming coverage, the communication node may include a beamforming module connected with the antenna array. An architecture for the beamforming module including a phase/amplitude converter (e.g., a phase shifter) and an amplifier (e.g., a power amplifier (PA)) may be considered.

Figure 4A:
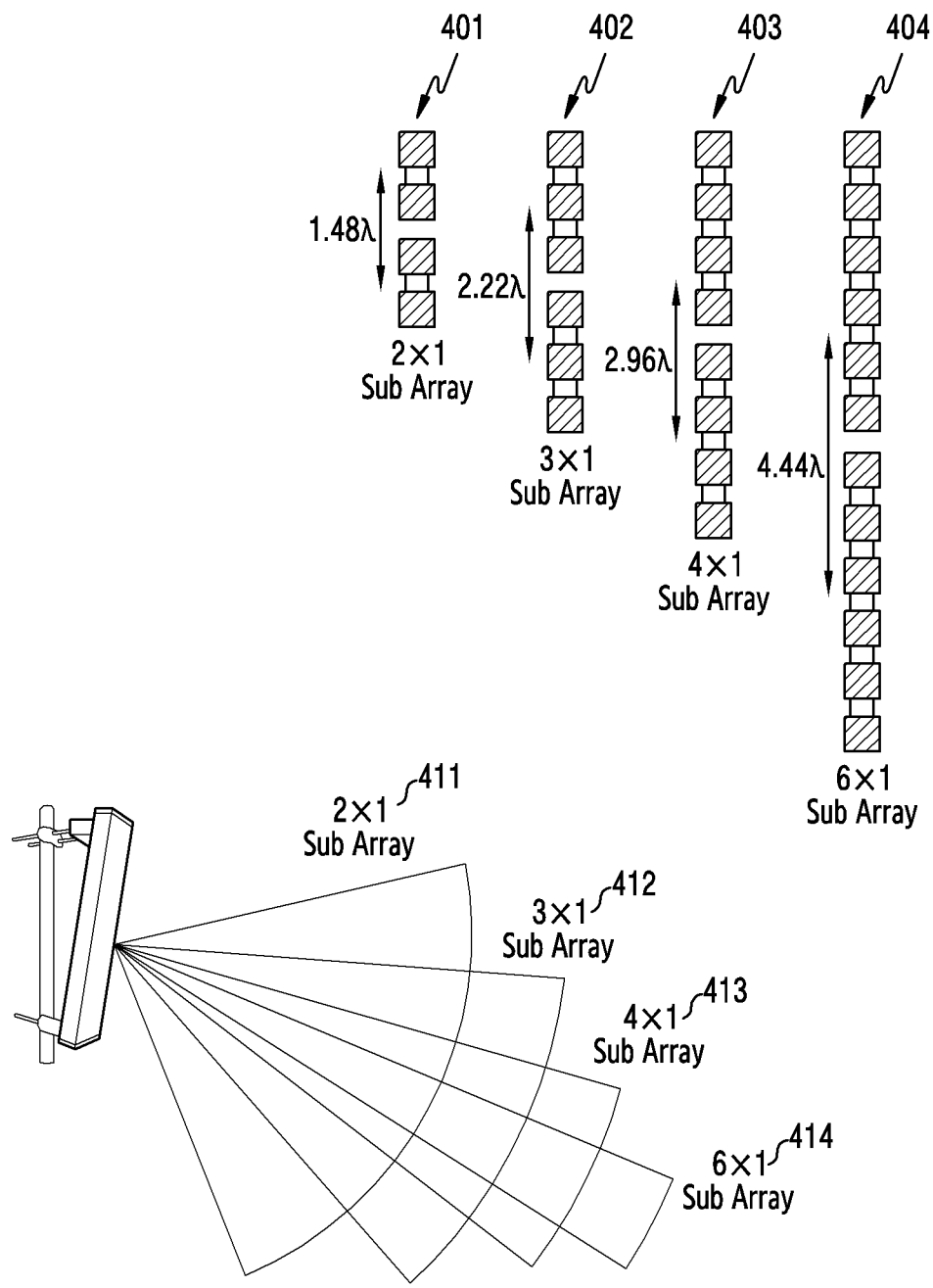
FIG. 4A is a diagram illustrating an example of a sub-array according to various embodiments.
Figure 4B:
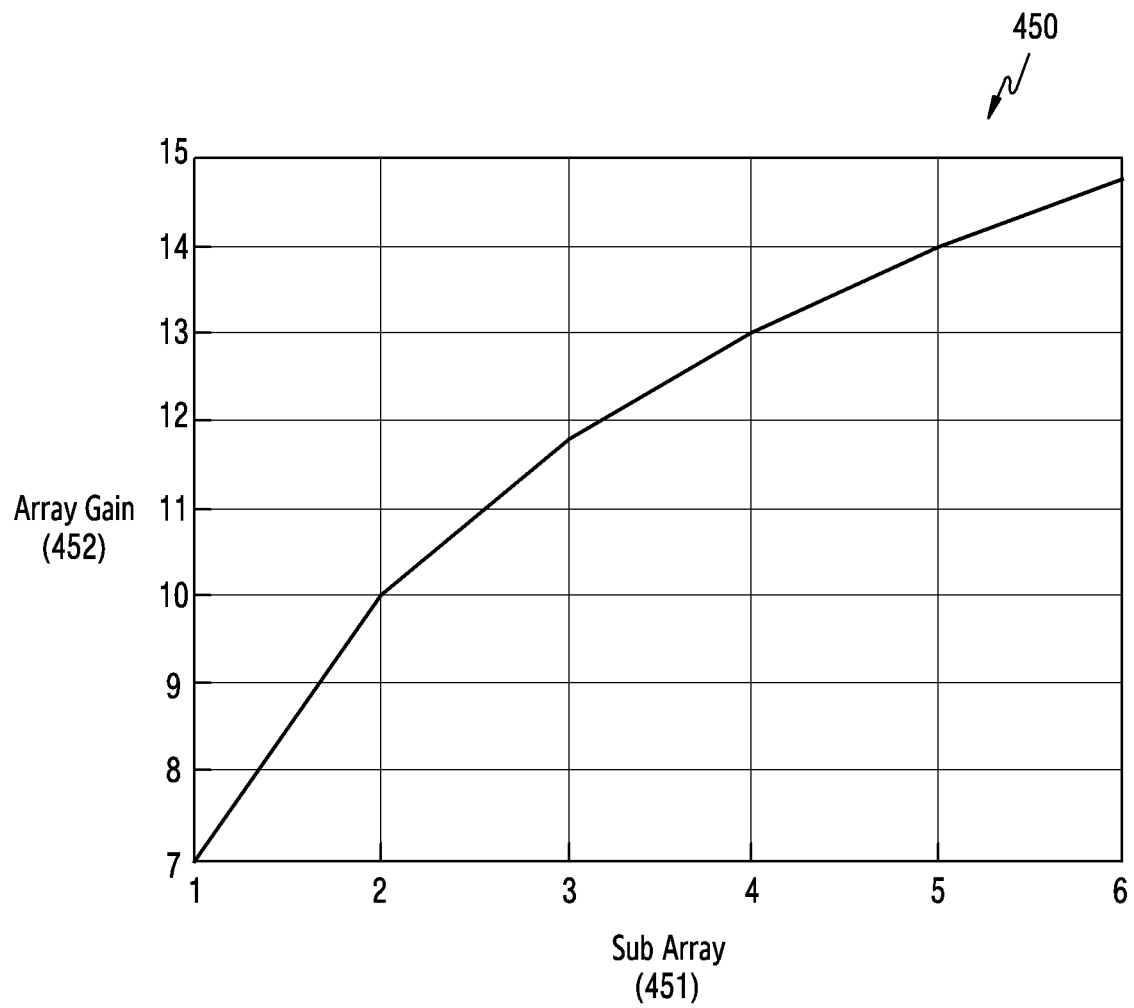
FIG. 4B is a graph illustrating an example of the sub-array according to various embodiments.

FIGS. 4A and 4B are diagrams illustrating an example of a sub-array according to various embodiments. For a high beamforming gain, more antenna elements than input ports may be used. To describe various example embodiments of the disclosure, an array antenna including sub-arrays each corresponding to an input port is explained. Each sub-array of the array antenna includes the same number of antenna elements, but various embodiments of the disclosure are not limited thereto. According to an embodiment, the number of the antenna elements of some sub-array may be different from the number of antenna elements of other sub-array.

Referring to FIG. 4A, the sub-array may include a plurality of antenna elements. In FIG. 4A, the sub-array of n×1 (n is an integer equal to or greater than 2) is described as a linear array, but various embodiments of the disclosure are not limited thereto. Various embodiments of the disclosure may be applied to a 2×2 or 4×2 sub-array.

The sub-array may be configured in various forms by considering the antenna gain and the beamforming performance. For example, the sub-array may be a 2×1 sub-array 401. For example, the sub-array may be a 3×1 sub-array 402. For example, the sub-array may be a 4×1 sub-array 403. For example, the sub-array may be a 6×1 sub-array 404. As entities (e.g., the antenna elements) for radiating a signal increase, the antenna gain may increase. That is, coverage may increase as the number of the antenna elements in the sub-array for one input signal (input port) increases. Referring to FIG. 4B, a graph 450 illustrates example gain performance based on the size of the sub-array. A horizontal axis 451 indicates the number of the antenna elements, and a vertical axis 452 indicates the array gain. As the number of the sub-arrays increases, the gain rises.

The antenna gain increases as the number of the antenna elements of the sub-array increases, whereas a physical spacing between ports may increase. In the 2×1 sub-array 401, the spacing between two sub-arrays, that is, the spacing between the ports may be 1.48λ. λ indicates a signal wavelength. For example, the spacing between the ports for the 3×1 sub-array 402 may be 2.22λ. For example, the spacing between the ports for the 4×1 sub-array 403 may be 2.96λ. For example, the spacing between the ports for the 6×1 sub-array 404 may be 4.44λ. As the number of the antenna elements in the sub-array increases, the physical spacing between the ports gradually widens (e.g., 1.48λ<2.22λ<2.96λ<4.44λ). As the physical spacing between the ports increases, the beamwidth reduces. Given the same phase shift range (e.g., phase offset), the antenna array coverage (may be referred to as beam coverage, a tilt angle, or tilt coverage) reduces. That is, as shown in FIG. 4A, tilt coverage 412 of the 3×1 sub-array 402 may be narrower than tilt coverage 411 of the 2×1 sub-array 401. Tilt coverage 413 of the 4×1 sub-array 403 may be narrower than the tilt coverage 412 of the 3×1 sub-array 402. Tilt coverage 414 of the 6×1 sub-array 404 may be narrower than the tilt coverage 413 of the 4×1 sub-array 403.

Beams having a narrow beamwidth are used in beam scan as the formable beam angle narrows by increasing the sub-array size. The beam scan using the narrow beam width causes a grating lob, which leads to performance degradation of the base station. For example, since an unnecessary array beam of the beams formed at the antenna affects other base station according to an array factor, what is needed is an optimal design of the array antenna considering the tradeoff between the antenna gain and the beamforming performance.

Since the narrow beam scan range causes the performance degradation, various embodiments of the disclosure provide a method for widening the tilt coverage. Signals radiated through a phase value applied to each antenna element are overlapped, and the overlapped signals form the beam. A boresight or a shape of the formed beam may vary depending on the phase values (e.g., a phase pattern) applied to the antenna elements. Since a change of the phase value may change the beam boresight, various embodiments of the disclosure provide a phase shifter circuit (which may also be referred to as a reconfigurable phase shifter circuit) for providing various beam boresights, to not reduce the substantial beam coverage of the array antenna. The beam coverage of the array antenna may be widened by configuring the phase shifter circuit for each state designated.

Figure 5:
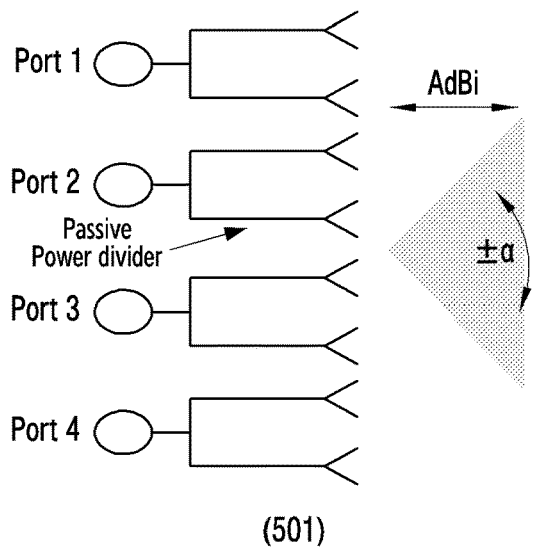
FIG. 5 is a diagram illustrating an example functional configuration of reconfigurable phase shifting according to various embodiments.
Figure 5:
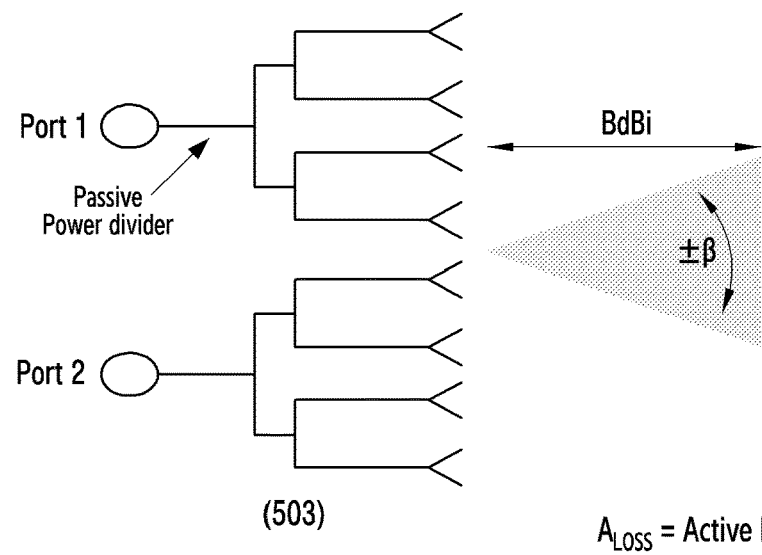
Figure 5:
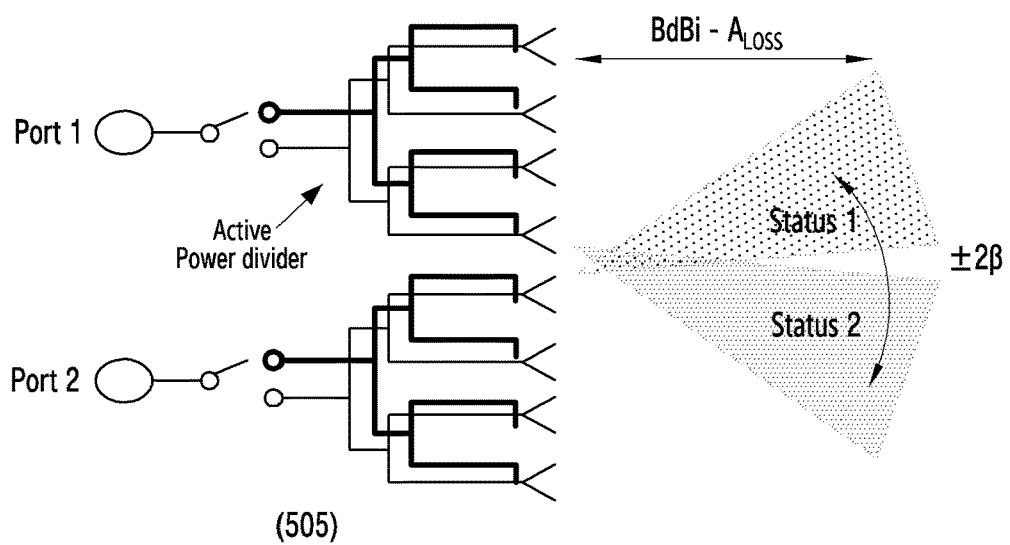

FIG. 5 is a diagram illustrating an example functional configuration of reconfigurable phase shifting according to various embodiments. As stated above, for the antenna beamforming, each antenna element requires the phase shifting (e.g., the phase value pattern applied through the phase shifter). It is difficult for the base station including the array antenna divided into a plurality of sub-arrays to implement the phase shifter for the array antenna due to high power, size, and cost increase. Accordingly, the antenna according to various embodiments may include the reconfigurable phase shifter circuit coupled with a power divider.

Referring to FIG. 5, a first divider circuit 501 represents a 4-port circuit using a passive power divider. The 4-port is an example, and the number of the input ports may increase or decrease. A 2×1 sub-array may be connected to each input port. A phase shifter may be added to at least some branch of the divider. The array antenna including the 2×1 sub-array may provide the tilt coverage of about ±a. The array antenna including the 2×1 sub-array may provide the antenna gain of about A decibel isotropic (dBi).

A second divider circuit 503 represents a 2-port circuit using a passive power divider. The 2-port is an example, and the number of the input ports may increase or decrease. A 4×1 sub-array may be connected to each input port. A phase shifter may be added to some branch of the divider. The array antenna including the 4×1 sub-array, which has the wider spacing between the ports than the array antenna including the 2×1 sub-array, may provide relatively narrow tilt coverage (e.g., ±β degrees (<a)). The array antenna including the 4×1 sub-array may provide the antenna gain of about B dBi. B may be less than A by 3 dB. As the number of the antenna elements in the sub-array increases, the antenna gain of about 3 dB increases.

A reconfigurable phase shifter circuit 505 according to various embodiments may include an active power divider. The reconfigurable phase shifter circuit 505 may provide an RF path from each input port of the 2-port to the sub-array. The 2-port is an example, and the number of the input ports may increase or decrease. A 4×1 sub-array may be connected to each input port. A phase shifter may be added to at least some branch of the active power divider.

The active power divider according to various embodiments may include a switch (e.g., an RF switch), to build various transmission paths, unlike the first divider circuit 501 or the second divider circuit 503 including only the passive devices. The active power divider may be adaptively connected with the individual circuit of the reconfigurable phase shifter circuit through the switching operation. Through the phase shifter circuit connected by the switching, the active power divider may provide the sub-array with the phase shifting values of a wider range. With the various phase shifting values, much wider tile coverage (e.g., ±2β degrees) may be provided. Example operations of the reconfigurable phase shifter circuit shall be described in greater detail below with reference to FIGS. 6A, 6B, 6C and 6D.

As the range of the phase shifting values varies, the reconfigurable phase shifter circuit 505 may acquire the wider tilt coverage than the second circuit 503. The array antenna including the reconfigurable phase shifter circuit 505 may provide the gain $B-A_{Loss}$ excluding a switching loss (or an active loss $B-A_{Loss}$) from the antenna gain of about B dBi according to the 4×1 sub-array. Embodiments of a phase shifter circuit structure for reducing such an insertion loss are described in greater detail below with reference to FIGS. 7A, 7B, 8A, 8B, 9, 10, 11, 12 and 13.

According to various embodiments, beams which may be formed through the antenna elements may increase, by inserting a switching structure connectable with various phase shifter circuits into the power divider. Without a separate sub-array for providing different phase values or a separate phase shifter, the active power divider may provide various power shifting values to the antenna elements. For example, the active power divider may provide the effect of adding the additional phase shifters without increasing a substantial product size, and thus provide the tilt coverage increase (e.g., 2β degrees >β degrees). In addition, since the switch connectable to various phase shifter circuits is deployed on the power divider, rather than the individual branch of the divider, the phase shifting of various ranges may be provided through the shape of the divider regardless of the number of the antenna elements of the sub-array and the RF switch. Such a deployment structure may be used to provide the necessary phase shifting, by setting the number of the antenna elements at an application level (e.g., a specific beamwidth request).

While the power divider is described as the example of the passive device for forwarding the input signal per port to each antenna element in the disclosure, the power divider may perform other function according to the signal flow and device operation. The passive device for conducting the divider function according to various embodiments may be referred to as a coupler, a combiner, a splitter, and so on. For example, providing the signal through the input port to each sub-array indicates that the passive device of the beamforming module performs the divider function, and does not exclude a role as other function of the passive device.

FIGS. 6A, 6B, 6C and FIG. 6D are diagrams illustrating operation examples of reconfigurable phase shifting according to various embodiments. To describe the reconfigurable phase shifting, example structures of the reconfigurable divider circuit 505 of FIG. 5 are described. The reconfigurable divider circuit may include an input unit, a switching unit (e.g., including a switch), a reconfigurable phase shifter circuit, and a power divider. The power divider may further include an active power divider connected to the switch.

Figure 6A:
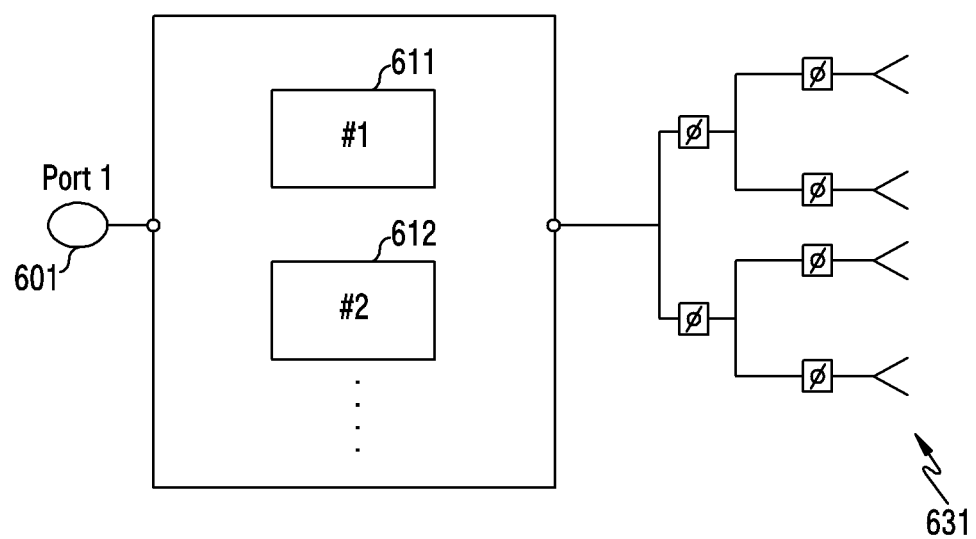
FIG. 6A is a diagram illustrating an operation example of reconfigurable phase shifting according to various embodiments.

Referring to FIG. 6A, an RF signal may be applied to an input port 601. The RF signal is forwarded to a radiator, for example, antenna elements through a designated path. The RF signal is forwarded to the power divider through one of a first phase shifter circuit 611 and a second phase shifter circuit 612 of the reconfigurable phase shifter circuit. The RF signal is radiated to the antenna elements through the power divider. The reconfigurable phase shifter circuit may adaptively provide the RF path according to a state which is set to provide various phase shifts, rather than providing a fixed RF path to the sub-array.

The reconfigurable phase shifter circuit may include a reconfigurable circuit, through the switching according to a designated state. According to an embodiment, the reconfigurable phase shifter circuit may include a separate physical circuit which is turned on or off according to the switching. According to an embodiment, the reconfigurable phase shifter circuit may include a switching circuit differently reconfigured according to the switching. Each phase shifter circuit configurable in the reconfigurable phase shifter circuit may provide a different phase range. By providing the different phase shift to the RF signal input from the port, the formable beam range through the sub-array may increase. The maximum phase shift range may be referred to as a phase offset.

If a switch (e.g., a single pole double throw (SPDT)) is connected to the first reconfigurable phase shifter circuit 611 (hereafter, a first state), first phase shift may be applied to the whole power signal divided to the sub-array. The antenna elements of the sub-array may radiate the signal applied with the designated phase shift values through the path (the divider path) transferring the RF signal. If the switch is connected to the second reconfigurable phase shifter circuit 612 (hereafter, a second state), second phase shift may be applied to the whole power signal divided to the sub-array. The antenna elements of the sub-array may radiate the signal applied with the designated phase shift values through the path (the divider path) transferring the RF signal.

By setting the different values of the first phase shift and the second phase shift, even if the RF signal of the first state and the RF signal of the second state pass through the same path, different phase shift effects exhibit. For example, since the different phase shift value is applied before the divider, the effect similar to the phase shifter which is substantially physically separated may be attained. According to an embodiment, each phase shift value of the reconfigurable phase shifter circuit may be determined based on a phase offset (PO) value. For example, the first phase shift may be set to (+)PO/2, and the second phase shift may be set to (−)PO/2. A specific design of the phase shift value shall be described in greater detail below with reference to FIG. 12.

The beamforming module may adaptively configure the reconfigurable phase shifter circuit, and provide the power divider with the signal applied with the required phase value, through the switching. According to an embodiment, the phase shifter circuit connected to the input port and the power divider through the switching may be determined according to a control signal provided from a processor. The control signal may designate the state of the beam scan. The processor may select the phase shifter circuit to provide the phase shift value corresponding to the beamforming range to provide through the antenna. According to an embodiment, the phase shifter circuit connected to the input port and the power divider through the switching may be determined according to a predefined order.

While the reconfigurable phase shifter circuit provides the phase shifter circuits according to the two states in FIGS. 6A, 6B, 6C and 6D, various embodiments of the disclosure are not limited thereto. According to an embodiment, three or more states may be operated according to the design, and the phase shifter circuit may be configured for each state. According to an embodiment, only some of N-ary phase shifter circuits may be activated according to the control signal of the processor or a user's manual input, and then one of the activated phase shifter circuits according to the control signal may be connected to the input port and the power divider.

The beamforming module may include a phase shifter disposed at each of branches of the divider. A separate phase shifter is connected to each antenna element, and thus the beam pattern is formed. In so doing, the phase shifter circuit of the disclosure is deployed before the divider, and accordingly different phase shifts are provided to the whole sub-array and the phase shift range may increase without additional phase shifters.

While the phase shifter is deployed at the individual branch of a divider 631 in FIG. 6A, various embodiments of the disclosure are not limited thereto. It is not easy to install the separate phase shifter at every antenna element because of the size and the cost increase, and thus the disclosure provides a method for variously deploying the phase shifter. For example, only some of the phase shifters of FIG. 6A may operate, or the phase shifter may be disposed at some branch only. Various phase shift deployments may be suggested, depending on the required circuit size and the phase adjustment range.

Figure 6B:
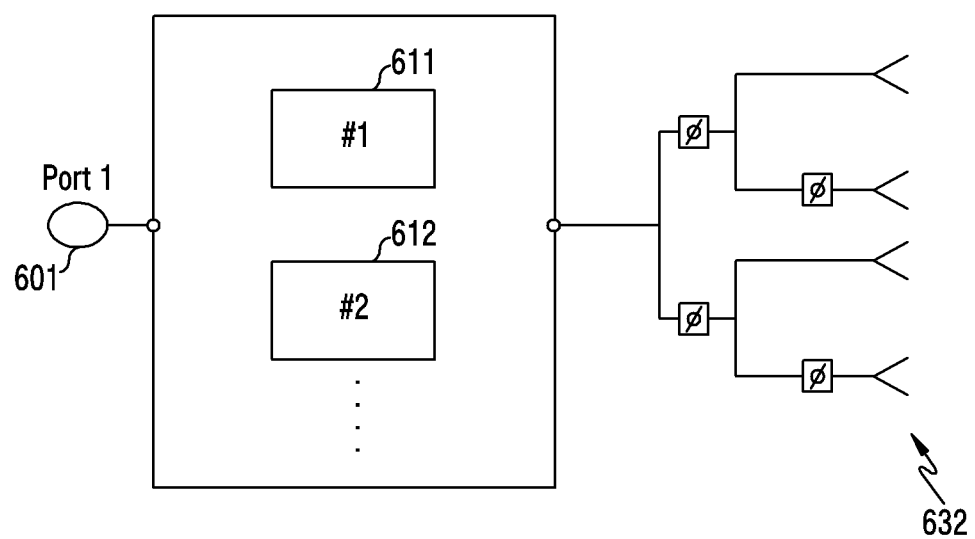
FIG. 6B is a diagram illustrating an operation example of the reconfigurable phase shifting according to various embodiments.

Referring to FIG. 6B, in some embodiments, the phase shifter may not be deployed at some of the branches of a divider 632 connected close to (e.g., $N_1$-ary layers from the antenna elements) the antenna elements. For example, the phase shifter may be deployed at only one of two branches (branches connected to the antenna elements) connected to a second layer in dividers (e.g., a 2-in-1 divider) divided into two layers.

Figure 6C:
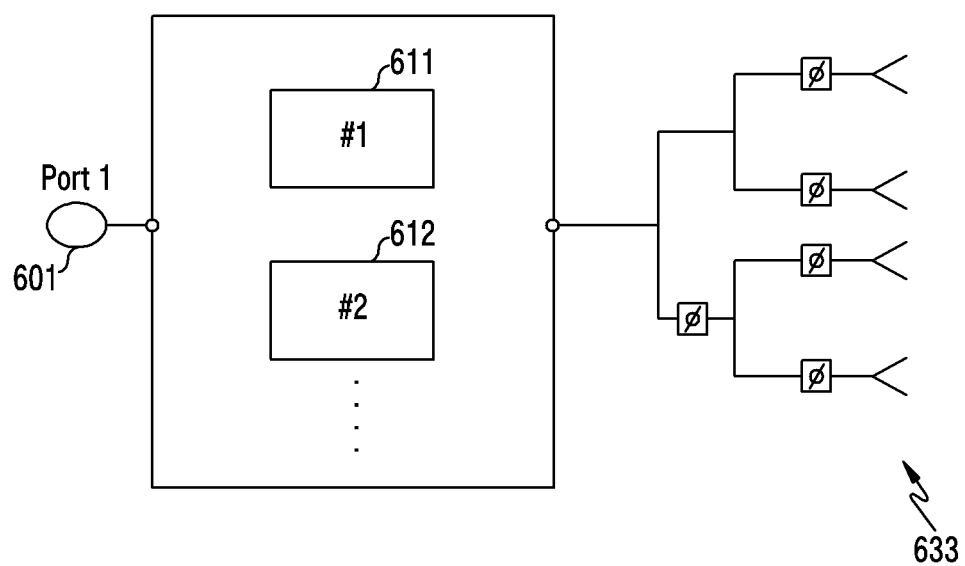
FIG. 6C is a diagram illustrating an operation example of the reconfigurable phase shifting according to various embodiments.

Referring to FIG. 6C, in some embodiments, the phase shifter may not be deployed at some of branches of a divider 633 connected close to (e.g., $N_2$-ary layers after the input port) the input port. For example, the phase shifter may be deployed at only one of two branches (branches connected to the antenna elements) connected to a first layer in the dividers (e.g., a 2-in-1 divider) divided into two layers.

Figure 6D:
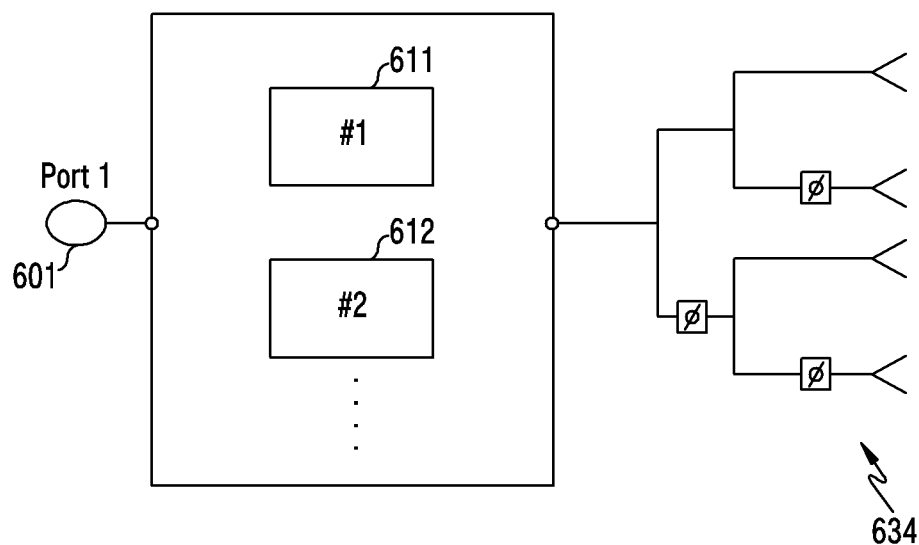
FIG. 6D is a diagram illustrating an operation example of the reconfigurable phase shifting according to various embodiments.

Referring to FIG. 6D, in some embodiments, the phase shifter may be deployed at one of branches of a divider 634 (e.g., a 2-in-1 divider), and the phase shifter may not be deployed at the other branch. By implementing the different phase shift at each branch, the effect of applying the substantially different phase patterns to the antenna elements may be achieved.

As shown in FIGS. 6B, 6C, and 6D, the beamforming module according to various embodiments may apply the phase shift values to the antenna elements in the sub-array, by designing the divider to pass through the phase shift path only in some path. For example, after the switch, a first phase shifter may be disposed at the lower branch of the active power divider. For example, the second phase shifter and the third phase shifter may be deployed at the lower branch of the following power dividers, respectively.

The phase shifter is added to at least one of the two branches of the divider in FIGS. 6B, 6C, and 6D to explain the example of adding the phase shifter to some branch, and various embodiments of the disclosure are not limited thereto. Two or more branches may be understood also as an embodiment of the disclosure.

As mentioned in the descriptions of FIGS. 5, 6A, 6B, 6C and 6D, since the number of the antenna elements increases in the MMU, applying the phase shifter to each of the antenna elements may incur a structural burden. In addition, it may be inefficient in terms of the loss to individually connect feed lines to the antenna elements, and to connect each feed line to a phase shift chipset through the layer including the antenna. In some embodiments, to address this problem, the beamforming module of the MMU may include an MMU-only phase shift structure, attached to an antenna substrate (e.g., a printed circuit board (PCB) including the antenna module) including a plurality of antenna elements. According to an embodiment, since it is not easy to apply a conventional phase shift chipset, the active power divider and the reconfigurable phase shifter circuit may be mounted on a surface of the antenna PCB. The reconfigurable phase shifter circuit on the PCB according to various embodiments may be mounted on the antenna PCB according to surface mounted technology (SMT). The phase shifter circuit structure disposed on the same board as the antenna may address the cost and the performance problem of the conventional phase shift chipset.

As described in FIG. 5, the insertion loss (hereafter, a switching loss) due to the switching exists though the tilt coverage increases. For example, the array antenna including the 4×1 sub-array is subject to the gain reduction corresponding to the switching loss compared to the B dBi of the second circuit 503. Accordingly, in designing the reconfigurable phase shifter circuit, it is required to minimize and/or reduce the switching loss. Now, a specific design method of the reconfigurable phase shifter circuit for minimizing and/or reducing the switching loss is described in greater detail below with reference to FIGS. 7A, 7B, 8A, 8B, 9, 10, 11, 12, 13 and 14.

Figure 7A:
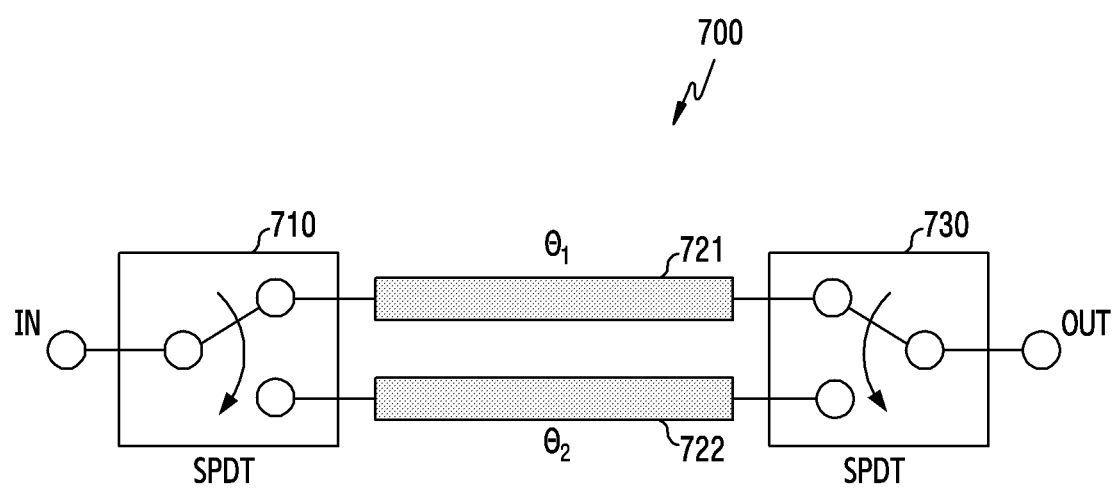
FIG. 7A is a diagram illustrating an example of a phase shifter circuit according to various embodiments.
Figure 7B:
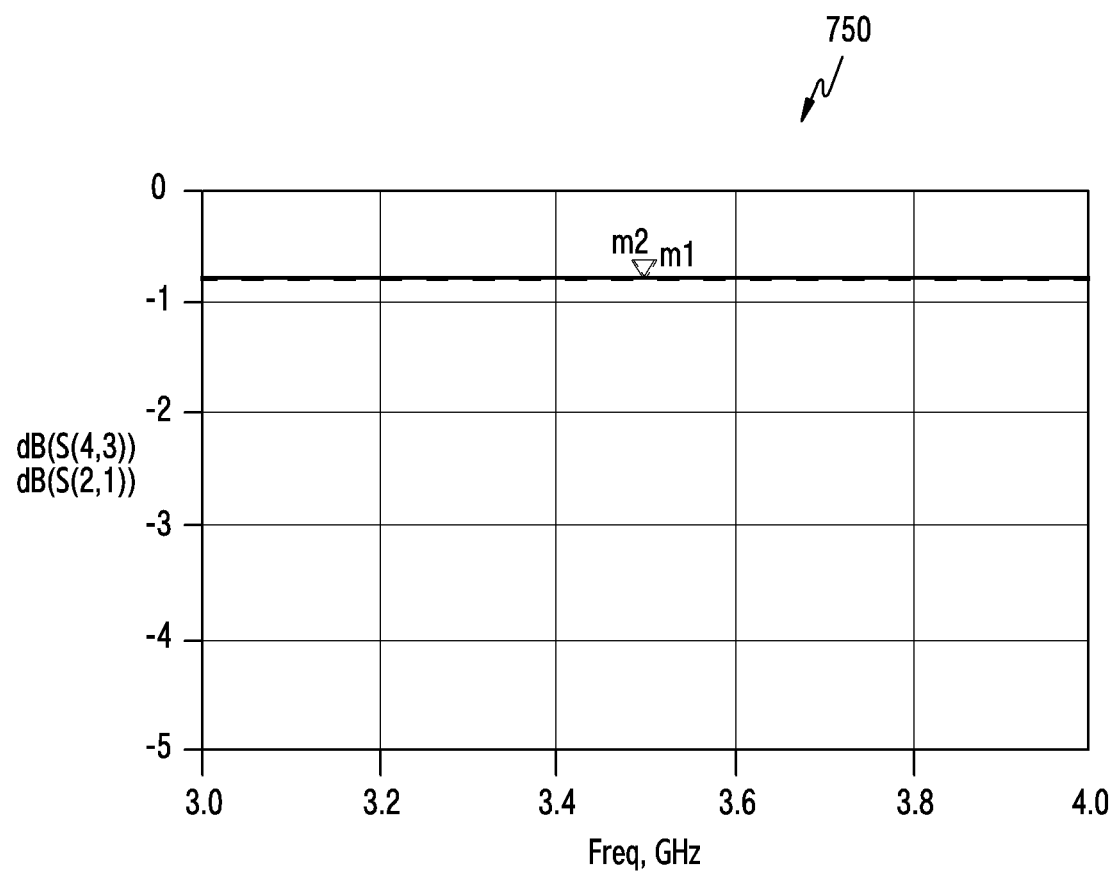
FIG. 7B is a diagram illustrating an example of the phase shifter circuit according to various embodiments.

FIG. 7A and FIG. 7B are diagrams illustrating example of a phase shifter circuit according to various embodiments. The phase shifter circuit in FIG. 7A and FIG. 7B may be included in the reconfigurable phase shifter circuit coupled with the active power divider of FIG. 5 or FIGS. 6A, 6B, 6C and 6D. The circuit provides the switching between two states, but it is noted that various embodiments of the disclosure may be applied to the switching between two or more states.

Referring to FIG. 7A, a phase shifter circuit 700 includes a circuit for providing the phase shift with a delay difference between two transmission lines, and may be referred to as a switched-line phase shifter circuit. Two switches (e.g., SPDTs) 710 and 730 may be included, to provide an adaptive path between the input from the port and the output to the power divider. In a first state, a first phase shift path 721 is connected to the input switch 710 and the output switch 730. The first phase shift path 721 may provide the phase shift of $O_1$. In a second state, a second phase shift path 722 is connected to the input switch 710 and the output switch 730. The second phase shift path 722 may provide the phase shift of $O_2$. The switched-line phase shifter circuit 700 for providing the separate transmit path according to the switching, which may ignore the bandwidth of the switch, is easy for the phase shift of the wide range, thanks to the wide loss bandwidth and no limit on the range of the phase offset.

Referring to FIG. 7B, a graph 750 illustrates the switching loss of the switched-line phase shifter circuit 700 illustrated in FIG. 7A. The horizontal axis indicates a frequency (unit: GHz), and the vertical axis indicates a transmission coefficient. S(2, 1) indicates an S parameter S21 which is the transmission coefficient of the first phase shift path 721, and S(4, 3) indicates an S parameter S21 which is the transmission coefficient of the second phase shift path 722. There is the loss—0.8 dB (frequency 3.5 GHz) in the first state $m_1$ and the second state $m_2$ according to the graph 750. Assuming that a switch serial loss is 0.4 dB, the switching loss is double. This is because the signal path includes two switches in series, with their switching loss. A high switching loss may provide a relatively low antenna gain. Besides, since the switched-line phase shifter circuit 700 may be subject to element damage or reliability verification due to the high-level RF input power based on the MMU characteristics, a phase shifter circuit of a different structure may be considered as an alternative.

Figure 8A:
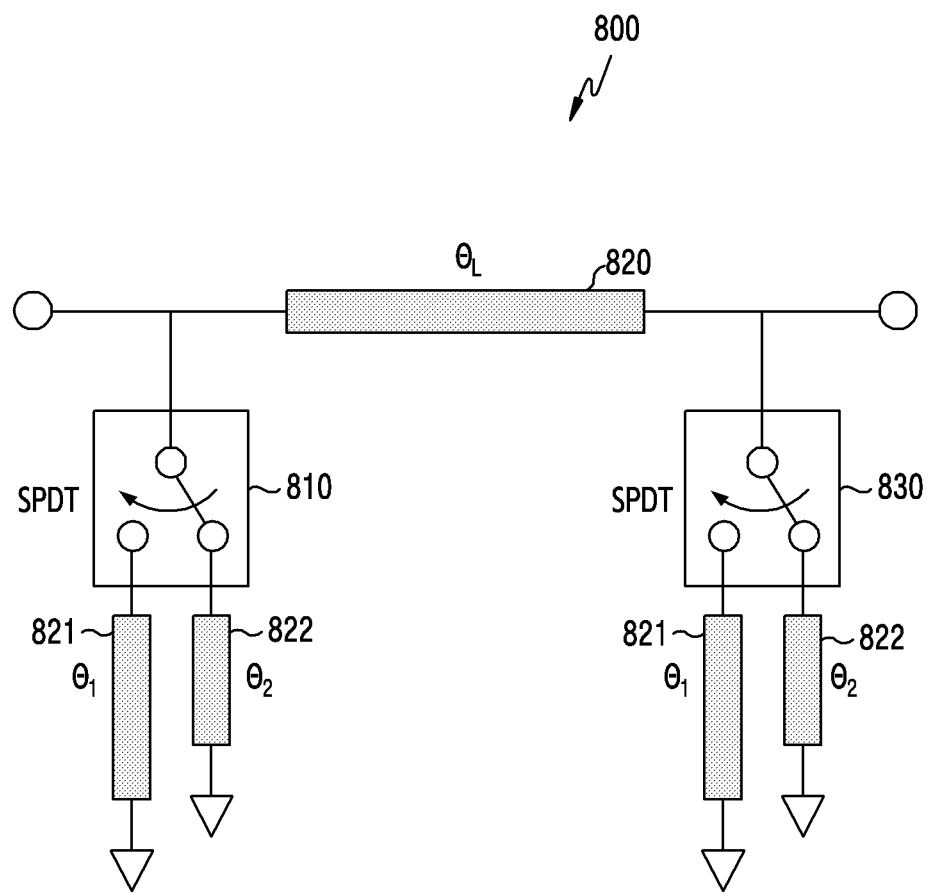
FIG. 8A is a diagram illustrating an example of a phase shifter circuit according to various embodiments.
Figure 8B:
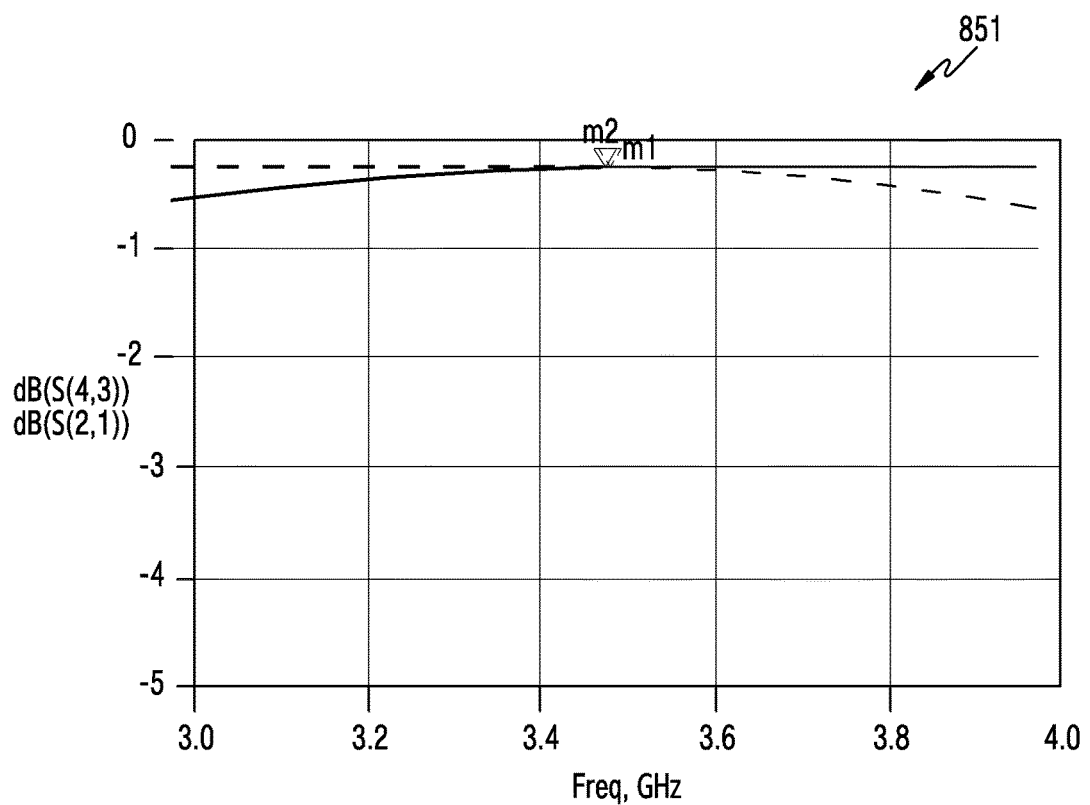
FIG. 8B are graphs illustrating an example of the phase shifter circuit according to various embodiments.
Figure 8B:
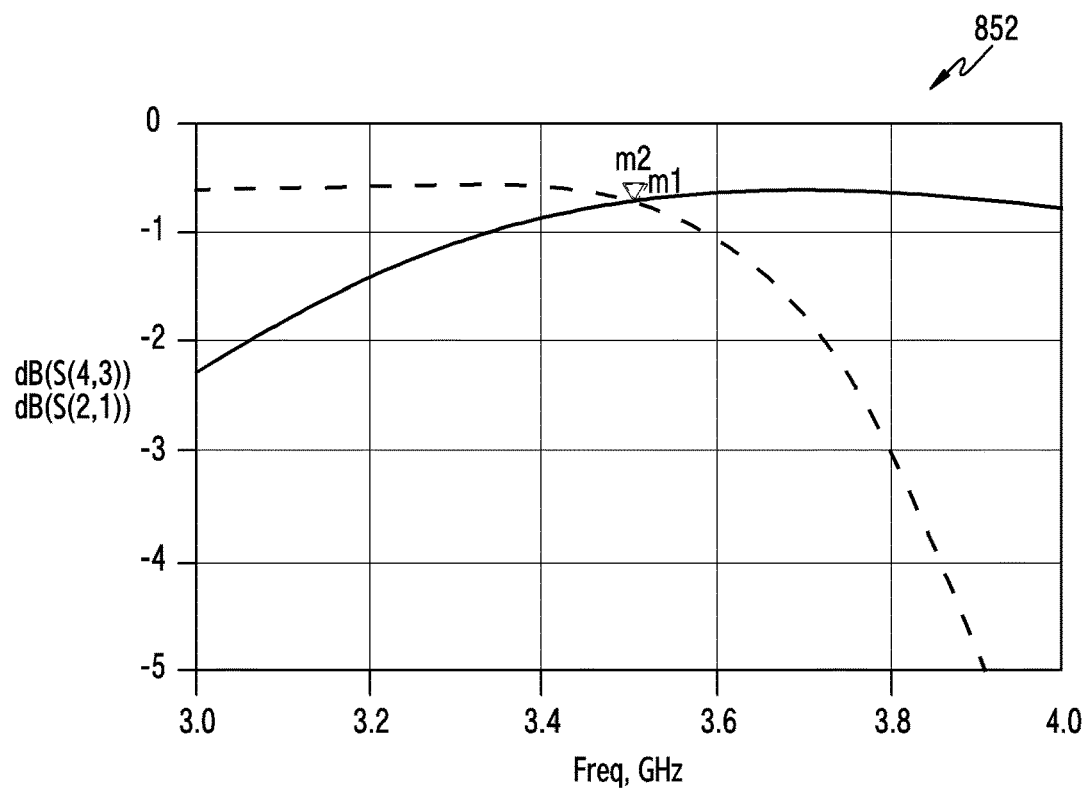

FIG. 8A and FIG. 8B are diagrams illustrating an example of a phase shifter circuit. The phase shifter circuit in FIG. 8A and FIG. 8B may be included in the reconfigurable phase shifter circuit coupled with the active power divider of FIG. 5 or FIGS. 6A, 6B, 6C and 6D. The circuit provides the switching between two states, but it is noted that various embodiments of the disclosure may be applied to the switching between two or more states.

Referring to FIG. 8A, a phase shifter circuit 800, which provides the phase shift with a reactance difference loaded to a main transmission line, may be referred to as a loaded-line phase shifter circuit. Two switches (e.g., SPDTs) 810 and 830 may be included, to adaptively add the reactance between the input from the port and the output to the power divider. In the first state, two first phase shift loads 821 may be connected to a main path 820 in parallel. The main path 820 may provide the phase shift of $\theta_L$. The first phase shift load 821 may provide the phase shift of $\theta_1$. In the second state, two second phase shift loads 822 may be connected to the main path 820 in parallel. The second phase shift load 822 may provide the phase shift of $\theta_2$. Since the switch is connected in a shunt stub structure, the loaded-line phase shifter circuit 800 may provide excellent loss performance (e.g., low switching loss).

Referring to FIG. 8B, a graph 851 represents the switching loss of the loaded-line phase shifter circuit 800 at a low phase offset. The low phase offset may indicate the phase offset below a designated threshold. The graph 851 represents the loss performance for the low phase offset. A graph 852 represents the switching loss of the loaded-line phase shifter circuit 800 at a high phase offset. The high phase offset may indicate the phase offset over the designated threshold. For example, the graph 851 represents the loss performance for the low phase offset. In the graphs, the horizontal axis indicates the frequency (unit: GHz), and the vertical axis indicates the transmission coefficient. S(2,1)($m_1$) indicates the S parameter S21 which is the transmission coefficient of the phase shifter circuit 800 in the first state with the first phase shift loads 821 added, and S(4,3)($m_2$) indicates the S parameter S21 which is the transmission coefficient of the phase shifter circuit 800 in the second state with the second phase shift loads 822 added.

Referring to the graph 851 and the graph 852, the wide band and the low loss (about 0.25 dB ($m_1$=0.267 dB, $m_2$=0.241 dB), loss=about 0.625 at 3.5 GHz) are identified at the low phase offset, whereas the narrow band and the high loss (about 0.75 dB ($m_1$=0.753 dB, $m_2$=0.752 dB), loss=1.75 at 3.5 GHz) are identified at the high phase offset. This is because the bandwidth is limited with the shunt stub structure, and the range (below about 45 degrees) of the available phase offset is set. Besides, since the phase offset below a specific value has no tolerance to the processing margin and provides merely the narrow-band signal, the loaded-line phase shifter circuit 800 may not provide the adequate loss performance at the high phase offset.

As above, the switched-line phase shifter circuit 700 is subject to the loss problem, and the loaded-line phase shifter circuit 800 is subject to the limited phase shift. The disclosure provides a phase shifter circuit which satisfies the loss performance and provides various phase shifts. The disclosed phase shifter circuit provides the required phase shift, by adding signals transferred through each path, through the parallel connection between the main path and the sub-path. Now, the phase shifter circuit provided by coupling the main path and the sub-path may be referred to as a quasi passive vector-sum (QPVS) phase shifter circuit. Operations of the QPVS phase shifter circuit shall be described in greater detail below with reference to FIGS. 9, 10, 11, 12 and 13.

Figure 9:
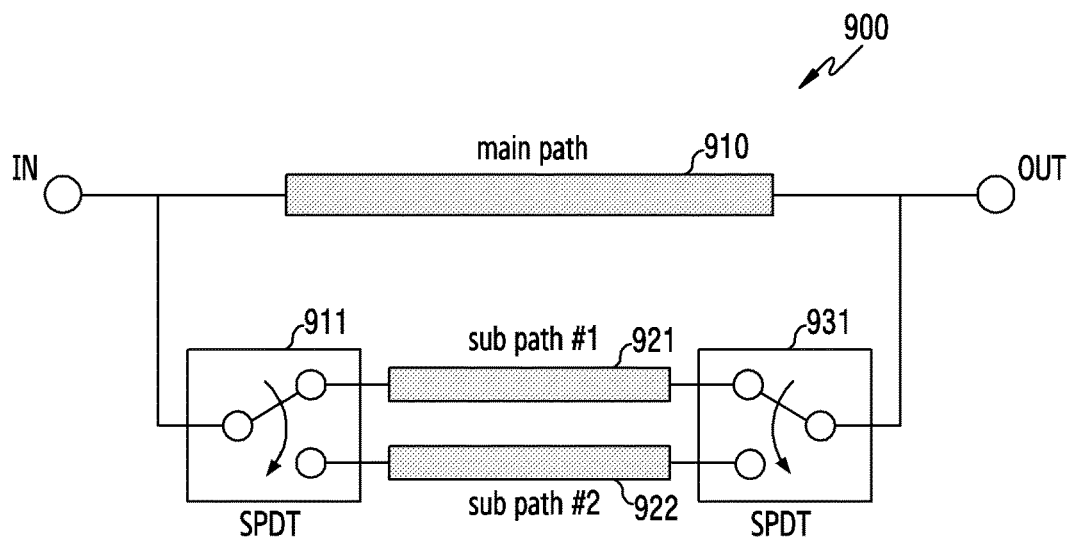
FIG. 9 is a diagram illustrating an example of a quasi passive vector-sum (QPVS) phase shifter circuit according to various embodiments.
Figure 9:
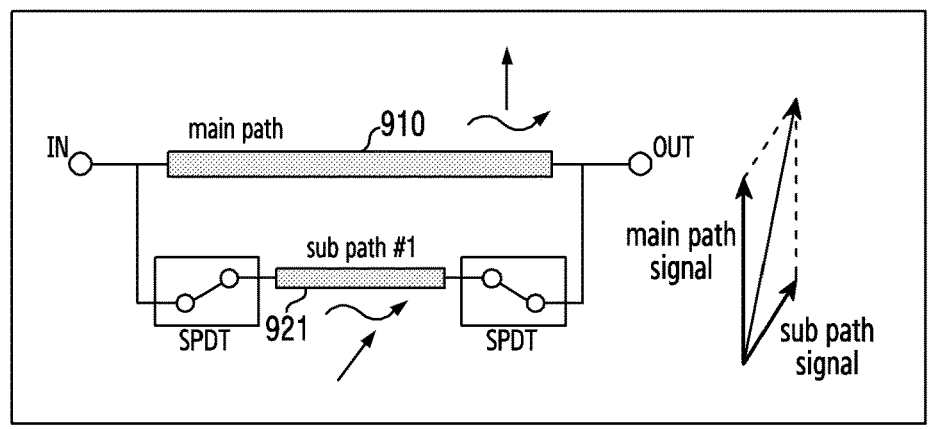
Figure 9:
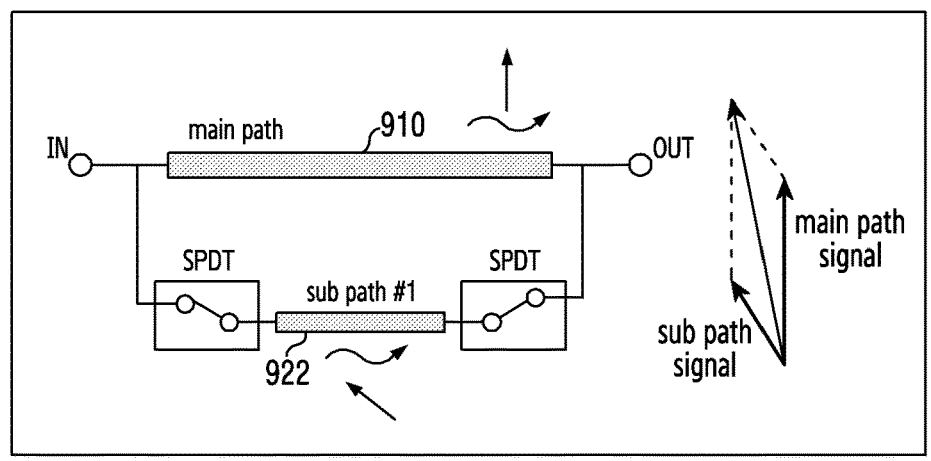

FIG. 9 is a diagram illustrating an example of a QPVS phase shifter circuit according to various embodiments. The phase shifter circuit in FIG. 9 may be included in the reconfigurable phase shifter circuit coupled with the active power divider of FIG. 5 or FIGS. 6A, 6B, 6C and 6D. The circuit provides the switching between two states (a first state 901 and a second state 902), but it is noted that various embodiments of the disclosure may be applied to the switching between two or more states.

Referring to FIG. 9, a QPVS phase shifter circuit 900 may include a main path 910, a first sub path 921 included in the phase shifter circuit in the first state 901, and a second sub path 922 included in the phase shifter circuit in the second state 902. To operate one of the first sub path 921 and the second sub path 922 according to the state, switches 911 and 931 (e.g., SPDTs) may be connected to both ends of the first sub path 921 or both ends of the second sub path 922. In the first state 901, the switches 911 and 931 are connected to both ends of the first sub path 921, and the first sub path 921 is connected to the main path 910 in parallel. In the second state 902, the switches 911 and 931 are connected to both ends of the second sub path 922, and the second sub path 922 is connected to the main path 910 in parallel.

An RF signal transmitted through the main path 910 and an RF signal transmitted through the sub path (e.g., the first sub path 921 or the second sub path 922) may be added at an output stage. The RF signal may be expressed as a vector. The RF signal output from the QPVS phase shifter circuit (e.g., the RF signal transferred to the power divider) may correspond to a vector sum of the RF signals. A desired RF signal vector sum may be acquired by controlling the phase shifts of the main path 910, the first sub path 921, and the second sub path 922.

The vector sum of two RF signals may correspond to the phase shift value of the output RF signal. The main path 910, the first sub path 921, and the second sub path 922 may be designed, by considering a desired phase shift range. For example, the main path 910 may be designed, wherein the RF signal transferred through the main path 910 has a fixed phase shift (e.g., (+) 90 degrees). The first sub path 921 and the second sub path 922 may be designed, wherein the RF signals transferred through the first sub path 921 and the second sub path 922 have the phase shift of different boresights based on the main path 910. According to an embodiment, the RF signals transferred through the first sub path 921 and the second sub path 922 may be symmetric based on the main path 910. A specific design method shall be described in greater detail below with reference to FIG. 12.

Figure 7B:
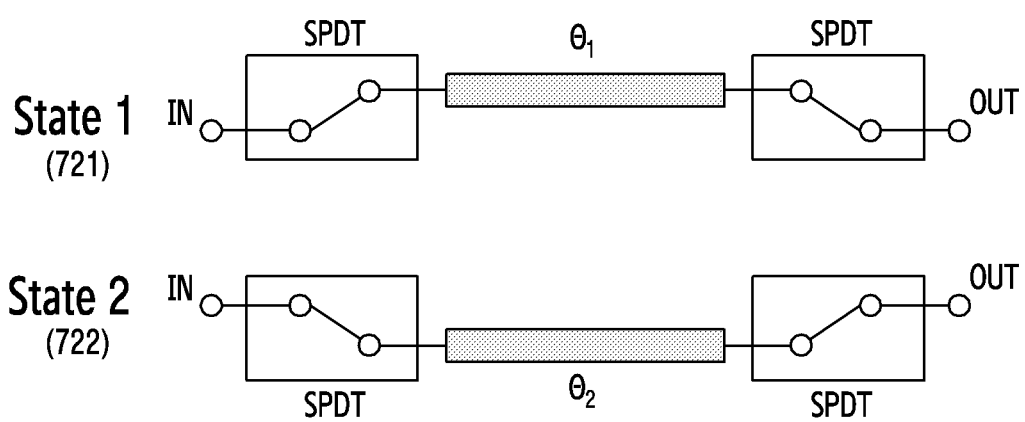

The QPVS phase shifter circuit 900 may provide the desired phase (within about 150 degrees), by coupling the main path 910 and the sub path (the first sub path 921 or the second sub path 922) which is set according to the switching. By coupling the main path 910 and the sub path in parallel, a wide band may be provided because there is no shunt stub structure. In addition, the switch serial loss may be reduced (the lower switching loss (<2) than the switched-line phase shifter circuit 700 of FIG. 7), by deploying the switch in the sub path in parallel.

Figure 10:
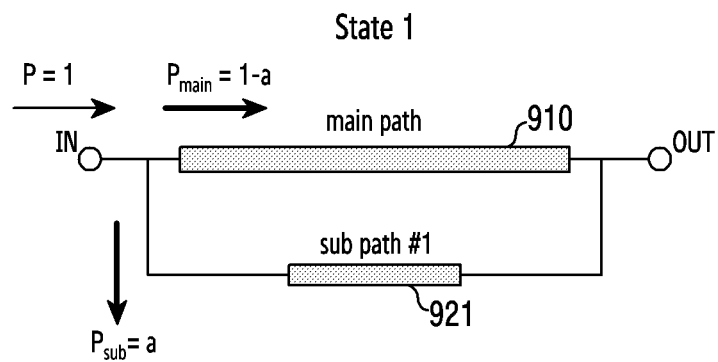
FIG. 10 is a diagram illustrating an example of an operation principle of a QPVS phase shifter circuit according to various embodiments.
Figure 10:
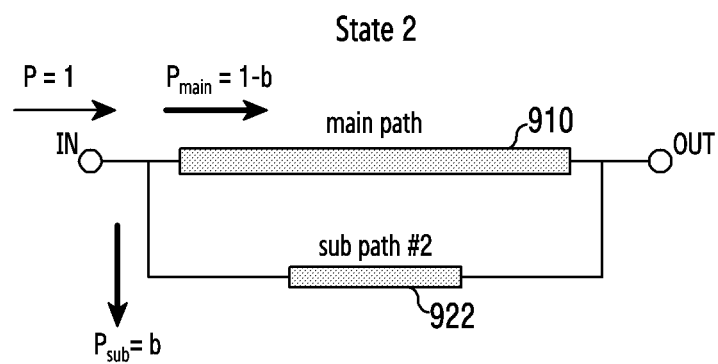
Figure 10:
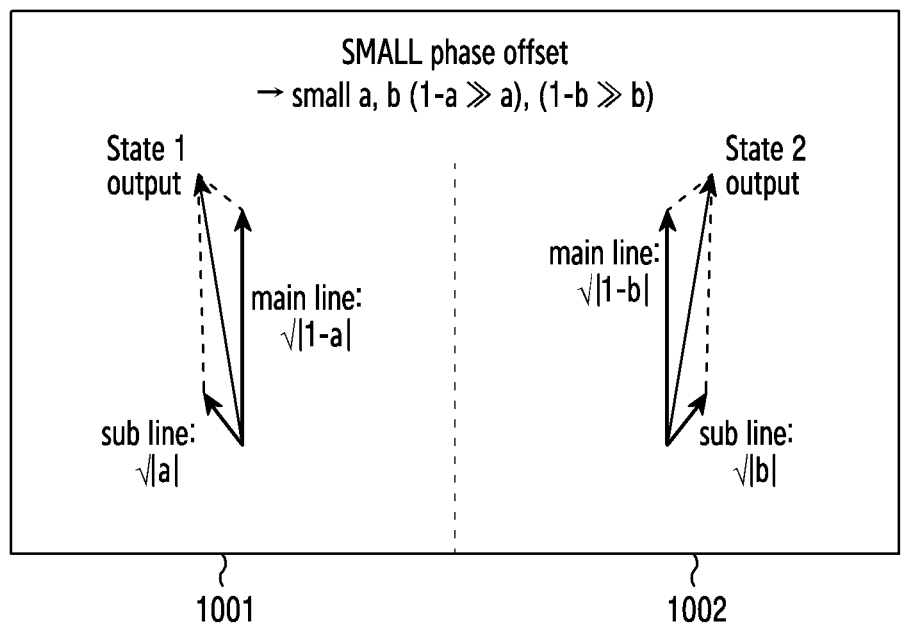
Figure 11:
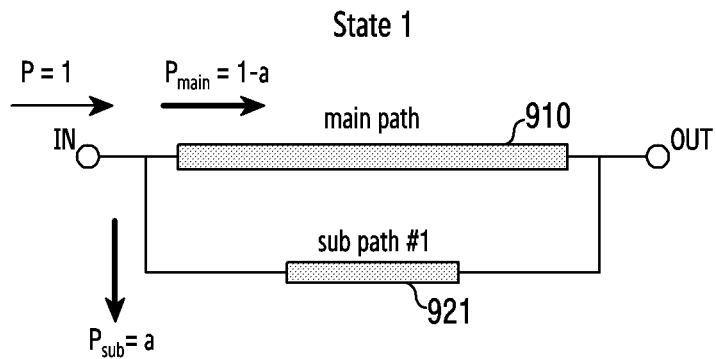
FIG. 11 is a diagram illustrating an example of an operation principle of a QPVS phase shifter circuit according to various embodiments.
Figure 11:
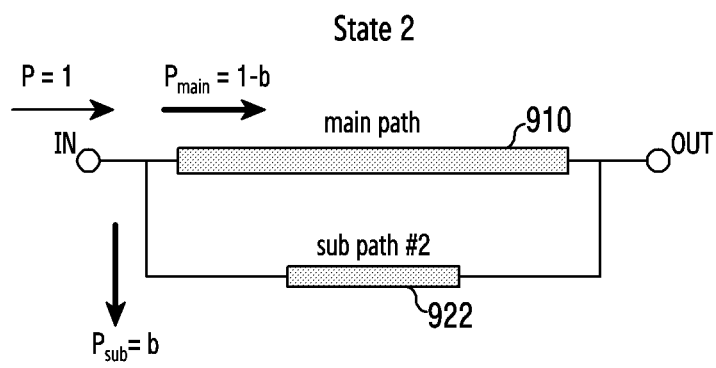
Figure 11:
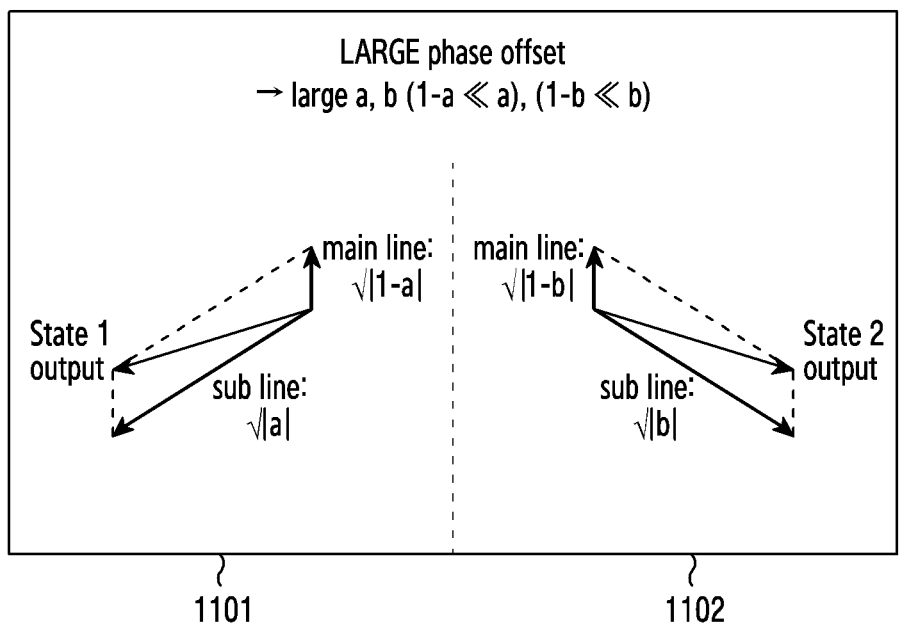

FIG. 10 and FIG. 11 are diagrams illustrating examples of an operation principle of a QPVS phase shifter circuit according to various embodiments. The QPVS phase shifter circuit represents the phase shifter circuit 900 of FIG. 9. The QPVS phase shifter circuit may include the main path 910 which provides the fixed phase value, and the sub path (the first sub path 921 in the first state, and the second sub path 922 in the second state) which changes the phase value according to the switching. An RF signal output from the phase shifter circuit has various phase shifts according to the change range of the sub path. For example, the phase shift range of the RF signal output from the phase shifter circuit may be determined, through a difference between the phase shift value provided from the first sub path 921 and the phase shift value provided from the second sub path 922.

Referring to FIG. 10, the QPVS phase shifter circuit provides a small phase shift range. The small phase shift range may indicate that the effect of the phase shift with the sub path is relatively less than the effect of the phase shift with the main path, and the phase shift is smaller than a reference value.

As most of the signal of the input port is transferred to the main path and the remaining signal is transferred to the sub path, the component of the main path is dominant in the direction component of the vector sum corresponding to the output signal. In a first state 1001, since the main path component '1−a' is much greater than the sub path component 'a' (1−a>>a), the effect of the main path component is large in the direction and the magnitude of the vector sum. For example, 'a>>b' may indicate that a is greater than a designated multiple (e.g., 10) of b. In a second state 1002, since the main path component '1−b' is much greater than the sub path component 'b' (1−b>>b), the effect of the main path component is large in the direction and the magnitude of the vector sum.

The QPVS phase shifter circuit may provide a low-loss gain, by transferring most of the signal to the main path, rather than providing the narrow phase shift. This is because the effect of the switch is low. According to an embodiment, if the effect from the switching loss is considerable, the beamforming module may provide the sub-array with the RF signal transferred through the corresponding phase shifter circuit. Such a phase shifter circuit may be configured based on the number of the antenna elements of the sub-array or the array factor (AF) at the design phase. The beamforming module may include a plurality of phase shifter circuits, and the phase shifter circuit for providing the narrow phase shift may be identified by control of the processor.

Referring to FIG. 11, a QPVS phase shifter circuit for providing a wide phase offset range is depicted. The wide phase offset range may indicate that the effect of the phase shift with the main path is relatively less than the effect of the phase shift with the sub path, and the phase shift is greater than a reference value.

As most of the input port signal is transferred to the sub path and the remaining signal is transferred to the sub path, the component of the main path is dominant in the direction component of the vector sum corresponding to the output signal. In the first state 1101, since the sub path component 'a' is much greater than the main path component '1−a' (1−a<<a), the effect of the sub path component is large in the direction and the magnitude of the vector sum. In the second state 1102, since the sub path component 'b' is much greater than the main path component '1−b' (1−b<<b), the effect of the sub path component is large in the direction and the magnitude of the vector sum.

The QPVS phase shifter circuit is highly affected by the phase shift of the sub path and the serial loss effect of the switch is considerable, but may provide the phase shift of the wide range. According to an embodiment, if the effect of the switching loss is subtle or the phase shift of the wide range is required, the beamforming module may provide the RF signal transferred through the corresponding phase shifter circuit to the sub-array. Such a phase shifter circuit may be configured based on the number of the antenna elements in the sub-array or the AF at the design phase. The beamforming module may include a plurality of phase shifter circuits, and the phase shifter circuit for providing the narrow-range phase shift may be identified by the control of the processor.

To configure the QPVS phase shifter circuit according to various embodiments, impedance matching may be performed. Through the impedance matching, the QPVS phase shifter circuit may be configured to maximize the power transmission of the RF signal. In so doing, the main path may be configured to provide the fixed phase (e.g., 90*n (n=1, 3, . . . )) as the reference value of the phase shift.

According to an embodiment, the main path 910 may include impedances. Each impedance value may be set to achieve the impedance matching, in the parallel connection with the sub path. Each impedance may be determined to provide the fixed phase shift (e.g., 90n). For example, $\theta_2$ may be set to the value of $90-2\theta_1$. For example, the main path may be designed to have the fixed phase shift of 90 degrees.

According to an embodiment, the sub path may include impedances. The sub path may be designed to achieve the impedance matching with the main path connected in parallel. In so doing, the phase shift of the first sub path and the phase shift of the second sub path which are defined according to the switching provide different reactances, whereas the sub path may be configured to be symmetric based on the fixed phase of the main path (e.g., if the impedance $Z_{sub\text{-}path\ \#1}$ of the first sub path is a+jb, the impedance $Z_{sub\text{-}path\ \#2}$ of the second sub path is a−jb). In addition, the difference of the phase shift of the first sub path and the phase shift of the second sub path which are defined according to the switching may be configured to acquire a desired phase offset (e.g., the maximum phase range shift). The phase shift value of the impedance may be designed such that the signal of the sub path connected for the designated state is symmetric based on the phase of the main path. This is to make the same magnitude of the synthetic signal of each sub path and the main path. For example, the sub path (the first sub path 921 and the second sub path 922) may be symmetric based on the fixed phase of 90 degrees of the main path.

Figure 12:
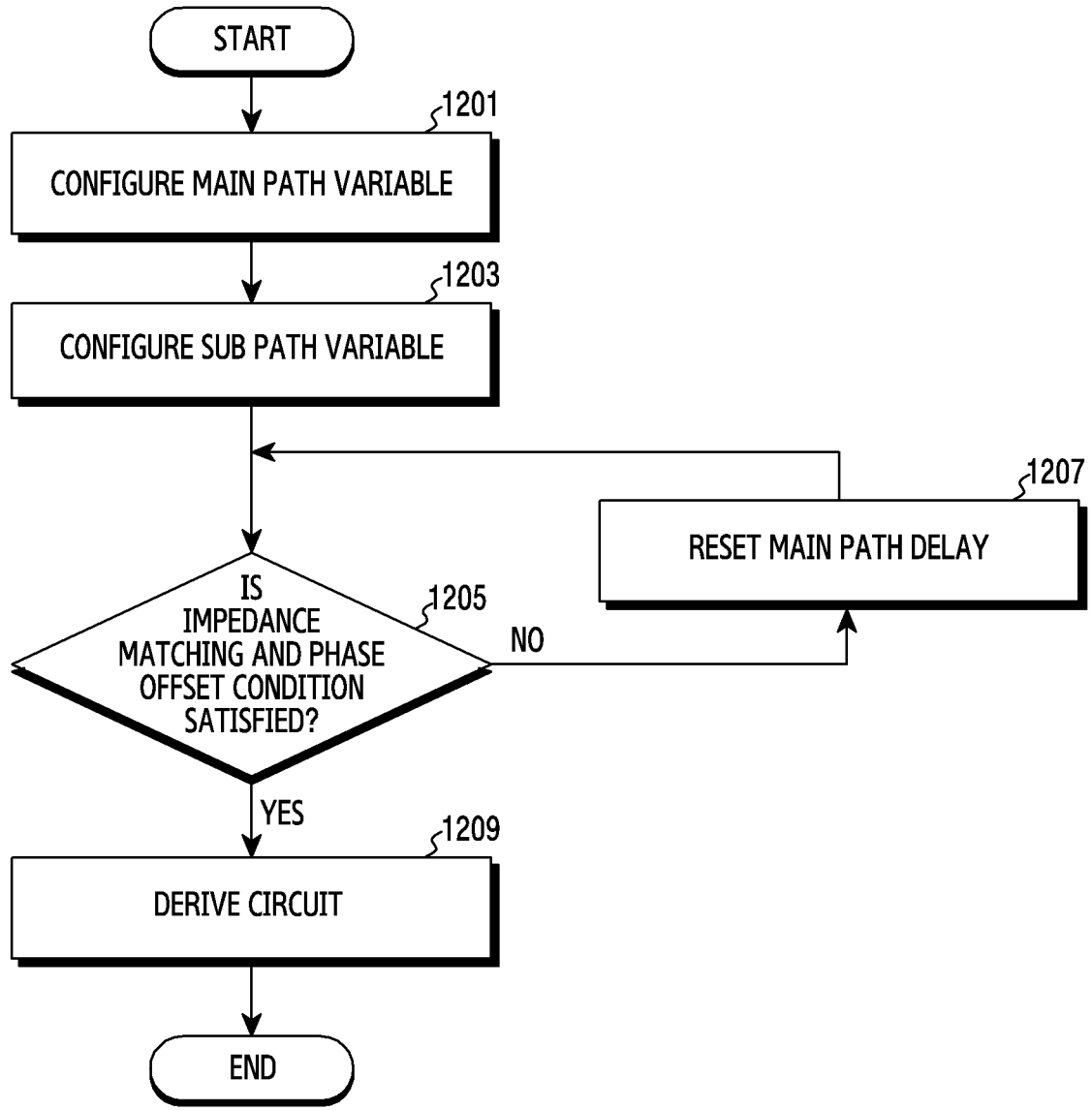
FIG. 12 is a flowchart illustrating an example method of designing a QPVS phase shifter circuit according to various embodiments.

FIG. 12 is a flowchart illustrating an example method of designing a QPVS phase shifter circuit according to various embodiments. This method may be used as a manufacturing method for designing the circuit. In addition, the method may be used to design a phase shifter circuit for variably setting impedance of each transmission path. Further, the method may be used to identify whether the beamforming module or the antenna equipment includes the phase shifter circuit according to embodiments of the disclosure, for example, whether the QPVS phase shifter circuit is realized. Hereinafter, designing operations may be performed by a circuit generator, but may be applied to a manufacturing process of a provider, implementation of the user, or processing of a design device.

Referring to FIG. 12, in operation 1201, the circuit generator may configure a main path variable of the QPVS phase shifter circuit of FIG. 9. According to an embodiment, the main path variable may include first impedance (phase $\theta_1$), second impedance (phase $\theta_2$), and third impedance (phase $\theta_3$) in the main path 910. According to an embodiment, $\theta_2$ may have the phase value which is different from $\theta_1+\theta_3$ by an integer multiple of 90 degrees, to acquire the fixed phase. In an initial operation, for example, if $\theta_1=\theta_3$, $\theta_2$ may be set to $90-2\theta_1$.

In operation 1203, the circuit generator may configure a sub path variable of the QPVS phase shifter circuit of FIG. 9. The QPVS phase shifter circuit includes two sub paths in FIG. 12, and the circuit generator may configure the path variables of the first sub path 921 and the second sub path 922. According to an embodiment, each sub path variable may be first impedance, second impedance, or third impedance in the sub path 921 and 922.

In operation 1205, the circuit generator may determine whether impedance matching and a phase offset condition are satisfied. The main path and each sub path may be coupled. In so doing, to minimize and/or reduce the switching loss of the sub path, the main path and each sub path may be connected in parallel. If the two paths are connected in parallel, the circuit generator may acquire a reflection parameter (e.g., a reflection coefficient, a parameter $S_{11}$), and a transmission parameter (e.g., a transmission coefficient, the parameter $S_{21}$) for the input and the output.

The circuit generator may identify the variable values such that the variables configured in operation 1201 and operation 1203 satisfy the impedance matching and the phase offset condition. For example, the parameter $S_{11}$ according to the connection of the main path and the first sub path may be $S_{11a}$, the parameter $S_{21}$ according to the connection of the main path and the first sub path may be $S_{21a}$, the parameter $S_{11}$ according to the connection of the main path and the second sub path may be $S_{11b}$, and the parameter $S_{21}$ according to the connection of the main path and the second sub path may be $S_{21b}$. At this time, the impedance matching condition may be defined as follows.

$$|S_{11a}|=|S_{11b}|=0 \tag{1}$$

$$|S_{21a}|=|S_{21b}|=1 \tag{2}$$

If the desired phase shift range, that is, the phase offset is the PO, the phase offset condition may be defined as follows.

$$|\angle S_{21a} - \angle S_{21b}| = PO \tag{3}$$

The circuit generator may identify each variable value such that the variables configured in operation 1201 and operation 1203 satisfy Equation 1, Equation 2, and Equation 3. If the impedance matching is not achieved or the phase offset condition is not satisfied ("No" in operation 1205), the circuit generator may perform operation 1207. If the impedance matching is achieved and the phase offset condition is satisfied ("Yes" in operation 1205), the circuit generator may perform operation 1209.

In operation 1207, the circuit generator may reset a delay variable of the main path. Since $\theta_2$ is set to have the phase value having the difference from $2\theta_1$ by the integer multiple n of 90 degrees in operation 1201, the circuit generator may, if not identifying the adequate impedance/phase values at the corresponding value n, change the value n. For example, the circuit generator may change the value n from 1 to 3. $\theta_2$ may be set to $270-2\theta_1$.

In operation 1209, the circuit generator may derive the QPVS phase shifter circuit including the main path and the sub paths, according to the main path variable and the sub path variables, which satisfy the impedance matching and the phase offset condition. According to an embodiment, the circuit generator may additionally identify whether it is possible to design the sub path circuit with a shorter phase. If it is possible to design the sub path with the shorter phase $\theta'$, the circuit generator may derive a new QPVS phase shifter circuit by replacing the corresponding sub paths. The circuit generator may repeat the corresponding determining operation, until acquiring the same parameter $S_{11}$ and parameter $S_{21}$ with the smallest phase.

The design method of FIG. 12 first configures the main path variable and then configures the sub path variables by way of example, but various embodiments are not limited thereto. That is, the sub path variables may be set first, and the main path variable may be adjusted.

While only the devices configured with the impedance and the phase are mentioned in FIG. 12, embodiments of the disclosure are not limited thereto. According to an embodiment, the sub path of the QPVS phase shifter circuit may include at least one nonlinear device such as a switch, a diode, or a transistor.

As above, the designed method has been explained in FIG. 12, but the corresponding design method may be used to determine whether to include the QPVS phase shifter circuit according to various embodiments. In some embodiments, whether to implement the QPVS circuit of the disclosure may be identified based on whether Equation 1, Equation 2, and Equation 3 are satisfied. According to an embodiment, the processor connected with the beamforming module may identify whether to configure the QPVS circuit of the disclosure of the corresponding beamforming module, by transmitting a test RF signal.

Figure 13:
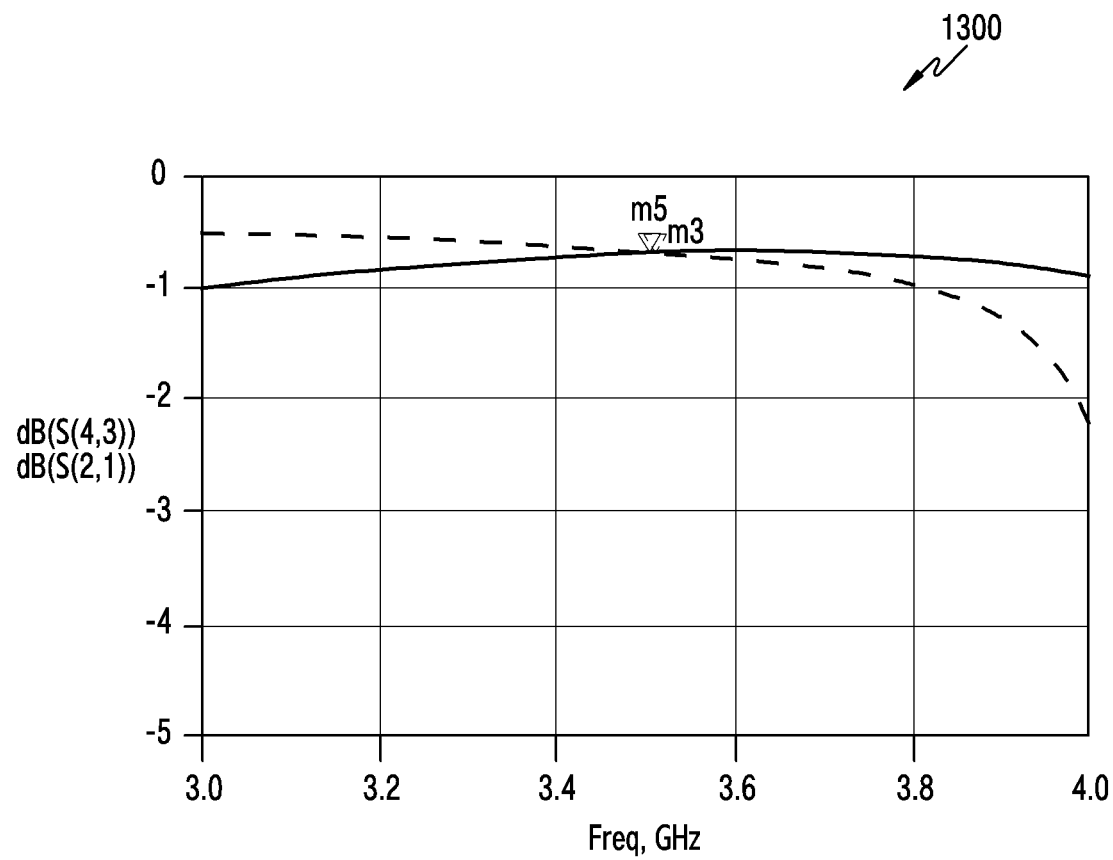
FIG. 13 is a diagram illustrating example performance of a QPVS phase shifter circuit according to various embodiments.
Figure 13:
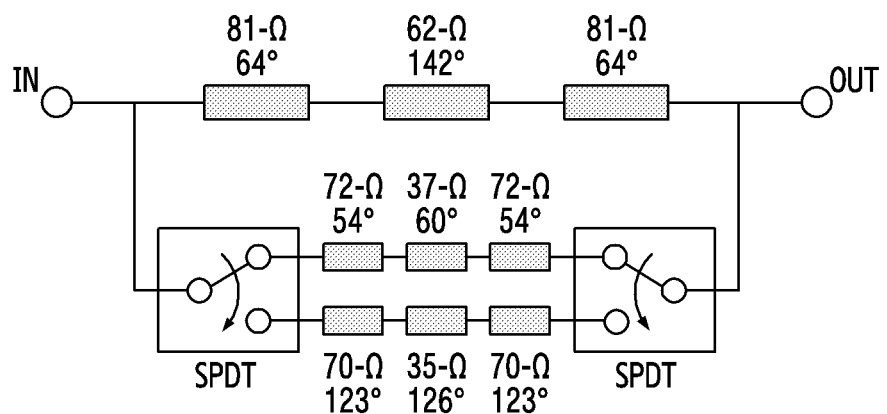

FIG. 13 is a diagram illustrating example performance of a QPVS phase shifter circuit according to various embodiments.

Referring to FIG. 13, a graph 1300 represents the performance according to the switching loss of the QPVS phase shifter circuit. In the graph 1300, the horizontal axis indicates the frequency (unit: GHz), and the vertical axis indicates the relationship with the transmission coefficient, that is, the parameter $S_{21}$ (unit: dB). In the band 3.5 GHz, at a point m3 according to the first state (the parallel connection of the main path and the first sub path) and a point m5 according to the second state (the parallel connection of the main path and the second sub path), their transmission coefficients are −0.694 dB and −0.694 dB respectively. Assuming that the switch serial loss is 0.4 dB, the switching loss of about 1.75 times occurs. The QPVS phase shifter circuit may provide the enhanced switching loss compared with the loss 0.8 dB of the switched-line phase shifter circuit in the graph 750 of FIG. 7B, and provide the stable bandwidth. In addition, compared with the loaded-line phase shifter circuit of FIG. 8B, the QPVS phase shifter circuit may provide the lower loss and the wide bandwidth at the high phase offset.

Figure 14:
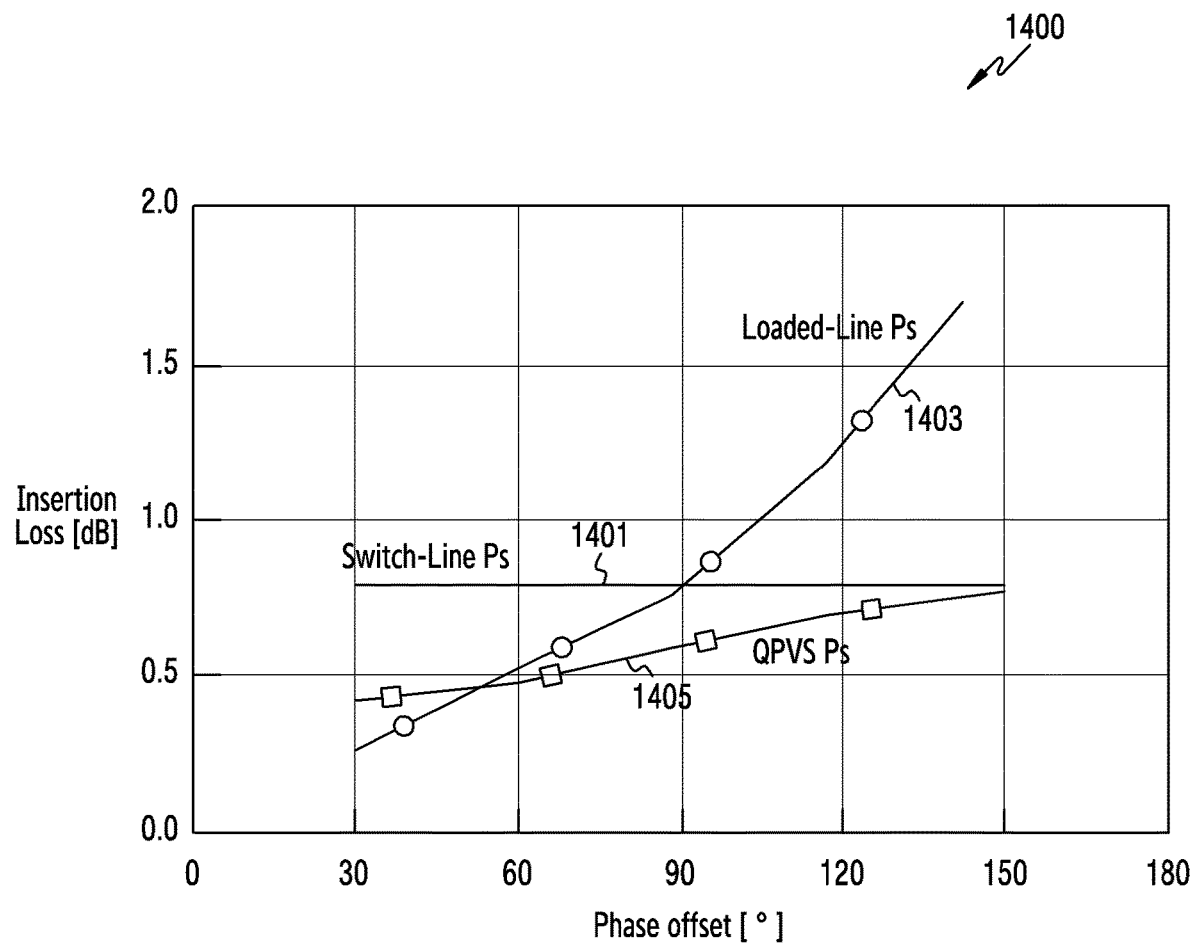
FIG. 14 is a graph illustrating example performance per phase offset based on types of a phase shifter circuit according to various embodiments.

FIG. 14 is a graph illustrating example performance per phase offset according to types of a phase shifter circuit according to various embodiments. Various types of the phase shifter circuit have been described in FIGS. 7A, 7B, 8A, 8B, 9, 10, 11, 12 and 13. According to an embodiment, the reconfigurable phase shifter circuit connected with the sub-array through the divider may be the switched-line phase shifter circuit 700. According to an embodiment, the reconfigurable phase shifter circuit connected with the sub-array through the divider may be the loaded-line phase shifter circuit 800. According to an embodiment, the reconfigurable phase shifter circuit connected with the sub-array through the divider may be the QPVS phase shifter circuit 900. In so doing, the phase shifter circuit of each type has advantages and disadvantages, and the beamforming module may adaptively configure the type of the phase shifter circuit which operates in the reconfigurable phase shifter circuit, by utilizing the advantages and disadvantages.

Referring to FIG. 14, a graph 1400 represents the insertion loss per type of the phase shifter circuit. The horizontal axis indicates the phase offset (unit: °), and the vertical axis indicates the insertion loss (unit: dB). A line 1401 indicates the insertion loss per phase offset of the switched-line phase shifter circuit 700. A line 1403 indicates the insertion loss per phase offset of the loaded-line phase shifter circuit 800. A line 1405 indicates the insertion loss per phase offset of the QPVS phase shifter circuit 900.

Since the insertion loss, for example, the switching loss affects the antenna gain finally derived, it is required to minimize and/or reduce the value. In some embodiments, the beamforming module may include a phase shifter circuit per type. For example, the beamforming module may include a 3-type phase shifter for providing various phase offset ranges. The optimal type of the phase shifter circuit varies depending on the phase offset range, and accordingly the beamforming module may adaptively configure the phase shifter circuit according to the phase offset range. For example, if the phase offset falls below a first threshold, the loaded-line phase shifter circuit 800 may be set. If the phase offset exceeds the first threshold and falls below a second threshold, the QPVS phase shifter circuit 900 may be set. If the phase offset exceeds the second threshold, the switched-line phase shifter circuit 800 may be set.

Figure 15A:
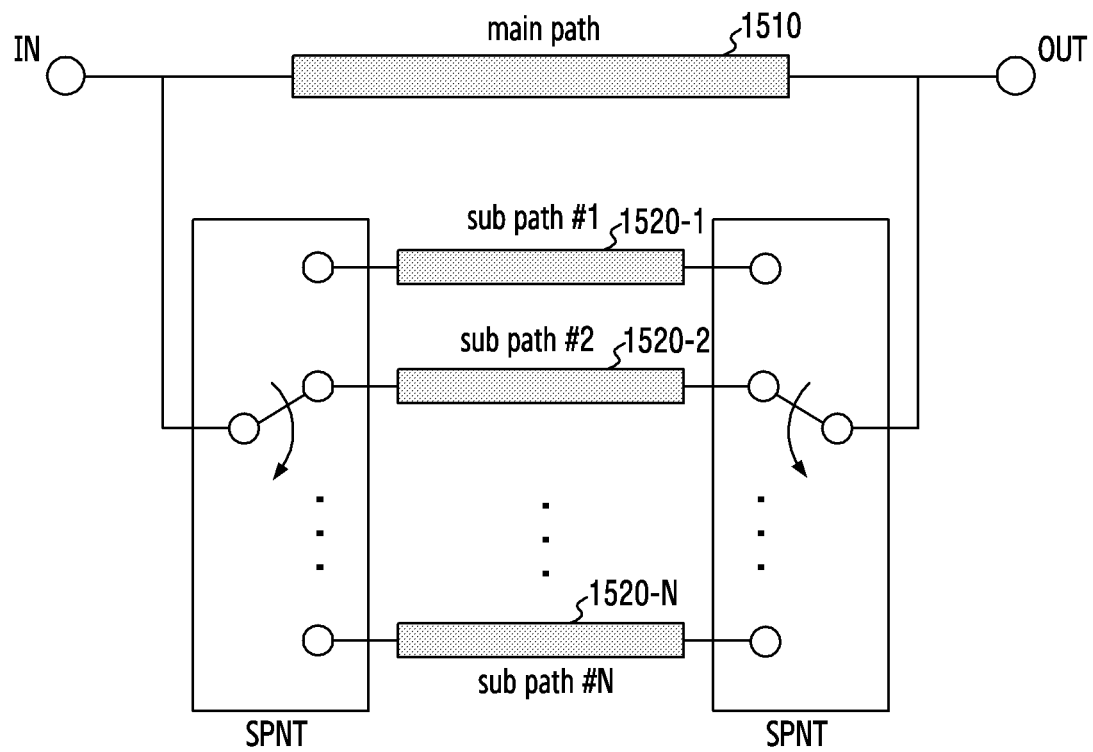
FIG. 15A is a diagram illustrating an example of an extended structure of a reconfigurable phase shifter circuit according to various embodiments.

FIG. 15A is a diagram illustrating an example of an extended structure of a reconfigurable phase shifter circuit according to various embodiments. While the QPVS circuit includes the two sub paths in FIGS. 9, 10, 11, 12 and 13, two or more sub paths may be used. FIG. 15A provides the extended structure including multiple bits, in a single-bit QPVS phase shifter circuit. The number of states increases, using a single pole N throw (SPNT) at an SPDT of the QPVS phase shifter circuit 900 of FIG. 9.

Referring to FIG. 15A, the reconfigurable phase shifter circuit, which is the extended QPVS circuit, may include a main path 1510, a first sub path 1520-1, a second sub path 1520-2, . . . , and an N-th sub path 1520-N (where N is an integer greater than 3). Each path may be connected in parallel to minimize and/or reduce the insertion loss.

Designing impedance and phase values of the main path 1510, the first sub path 1520-1, the second sub path 1520-2, . . . , and the N-th sub path 1520-N (where N is an integer greater than 3) may adopt Equation 1, Equation 2, and Equation 3 of FIG. 12 in a similar manner. The impedance of the main path 1510 and each sub path 1520-i may be designed to satisfy an impedance matching condition (reflection coefficient=0, transmission coefficient=1) in the parallel connection. The phase of each sub path may be designed symmetrically based on the phase value of the main path, to acquire the vector sum magnitude finally derived.

Figure 15B:
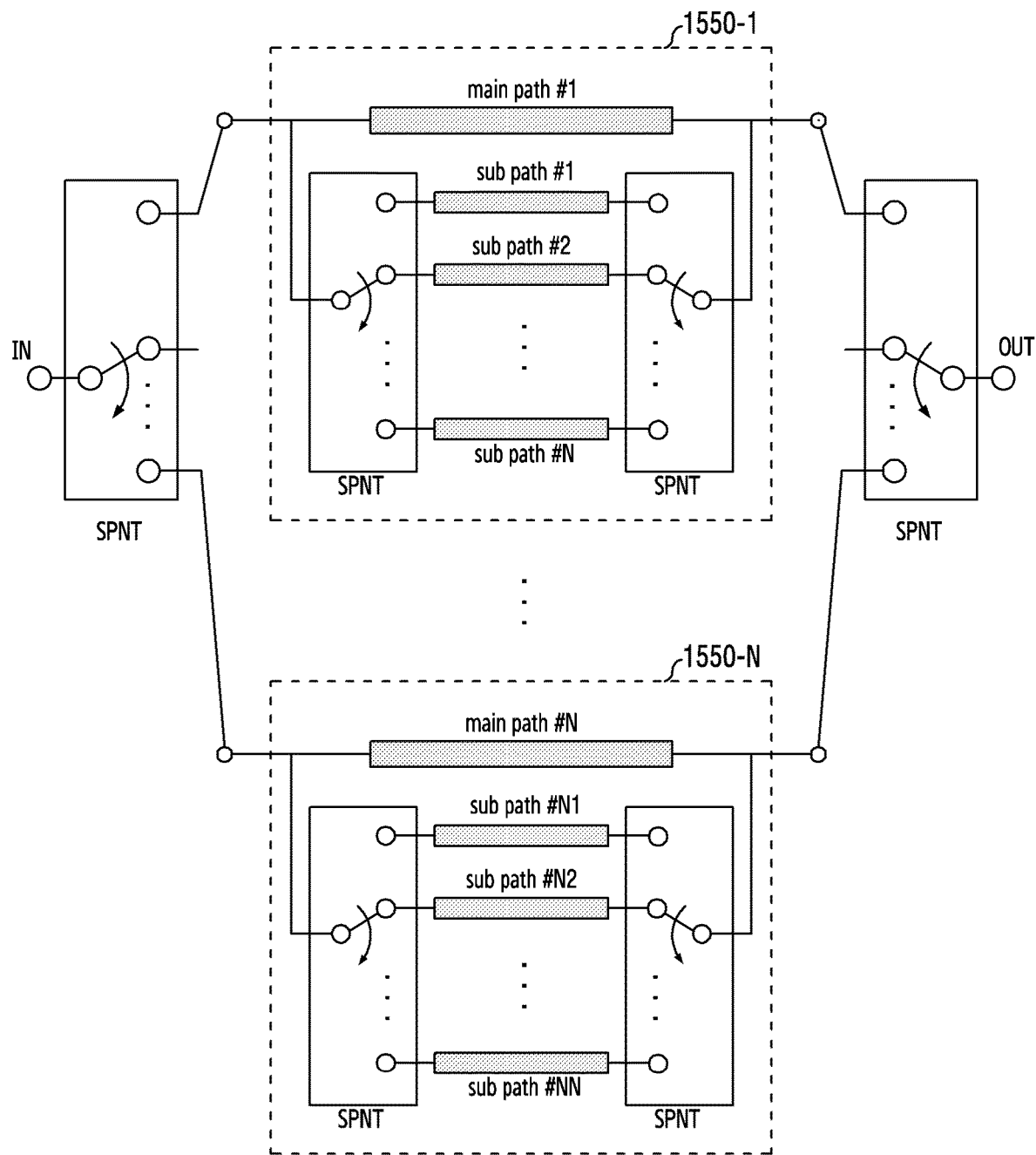
FIG. 15B is a diagram illustrating an example of the extended structure of the reconfigurable phase shifter circuit according to various embodiments.

FIG. 15B is a diagram illustrating an example of the extended structure of the reconfigurable phase shifter circuit according to various embodiments. The reconfigurable phase shifter circuit may include a set of the extended QPVS circuits of FIG. 15A. The number of the states to operate may increase, by including more SPNT and QPVS circuits in a hierarchical structure in the extended QPVS phase shifter circuit of FIG. 15A.

Referring to FIG. 15B, the reconfigurable phase shifter circuit may be connected with a first extended QPVS phase shifter circuit 1550-1 through an N-th extended QPVS phase shifter circuit 1550-N in parallel, through the SPNT of the input port and the SPNT of the output. The insertion loss may be minimized and/or reduced through the parallel connection. According to an embodiment, each extended QPVS phase shifter circuit provides the fixed phase value, and the beamforming module may achieve the detailed phase adjustment via the sub path through the switching of the individual extended QPVS circuit, as the number of the controllable states increases.

As stated above, as the number of the antenna elements in the sub-array increases (e.g., two sub-arrays→4 sub-arrays), the antenna gain improves. If the size of the sub-array increases, the tilt range reduces to cause the performance degradation. The beamforming module according to various embodiments may provide a plurality of states through the reconfigurable phase shifter circuit. A situation for covering ±A° (A>0) is assumed. If the reconfigurable phase shifter circuit operates two states, the combination of the main path and the sub path of the reconfigurable phase shifter circuit may cover ±A°/2 in each state. If the reconfigurable phase shifter circuit operates three states, the combination of the main path and the sub path of the reconfigurable phase shifter circuit may cover ±A°/3 in each state.

According to various embodiments, the implementation of the disclosure may be identified, by configuring each phase shift value not to overlap the boresights of the first signal radiated in the first state of the reconfigurable phase shifter circuit and the second signal radiated in the second state of the reconfigurable phase shifter circuit. By deploying the reconfigurable phase shifter circuit before the power divider and physically separating the adjustable beam scan range, the beam direction per state may not overlap, although the phase shifter of the individual branch is disposed. For example, the directions of the beams formed individually may be physically distinguished.

An apparatus and a method according to various embodiments of the disclosure, may provide wide coverage, by providing wide-range phase shift through a power divider and a phase shifter circuit.

According to an embodiment, An antenna apparatus comprising: an array antenna comprising a sub-array, a power divider and a reconfigurable phase shifter circuit, wherein the reconfigurable phase shifter circuit is configured to provide a first phase shift value based on a switch, in a first state and provide a second phase shift value different from the first phase shift value based on the switch, in a second state.

In some embodiments, wherein the reconfigurable phase shifter circuit is arranged after a port input and before a branch of the power divider.

In some embodiments, wherein the reconfigurable phase shifter circuit comprises: a first phase shifter circuit including a main path and at least two sub paths comprising a first sub path and a second sub path connected in parallel, wherein the first phase shifter circuit is configured to connect the first sub path to the main path, in the first state based on an operation of the switch, and to connect the second sub path to the main path, in the second state based on an operation of the switch.

In some embodiments, wherein a phase provided by the main path provides a fixed value, and a phase provided to the first sub path and a phase provided to the second sub path are symmetric based on the fixed value.

In some embodiments, wherein a difference of a first phase shift vector provided by the parallel connection of the main path and the first sub path in the first state and a second phase shift vector provided by the parallel connection of the main path and the second sub path in the second state corresponds to a required phase offset.

In some embodiments, wherein a phase value of at least one impedance of the main path, at least one first impedance phase value of the first sub path, and at least one second impedance phase value of the second sub path are determined based on a required phase offset.

In some embodiments, wherein the first sub path or the second sub path comprises at least one of a switch, a diode, or a transistor.

In some embodiments, wherein at least one impedance of the main path and at least one first impedance value of the first sub path are determined to achieve impedance matching, and at least one impedance of the main path and at least one second impedance value of the second sub path are determined to achieve impedance matching.

In some embodiments, wherein the reconfigurable phase shifter circuit comprises a second phase shifter circuit having a switched-line structure, wherein the second phase shifter circuit is configured to: serially connect a first circuit to an input port and an output port, in the first state based on an operation of the switch, and serially connect a second circuit to the input port and the output port, in the second state based on an operation of the switch, wherein the first circuit has an impedance providing the first phase shift value, and the second circuit has an impedance providing the second phase shift value.

In some embodiments, wherein the reconfigurable phase shifter circuit comprises a third phase shifter circuit having a loaded-line structure, wherein the third phase shifter circuit is configured to: connect first phase shift loads in parallel to the main path, the input port and the output port, in the first state based on an operation of the switch, connect second phase shift loads in parallel to the main path, the input port and the output port, in the second state based on an operation of the switch, and connect a second circuit to the input port and the output port, wherein the first circuit has an impedance providing the first phase shift value, and the second circuit has an impedance providing the second phase shift value.

In some embodiments, the antenna apparatus further comprising at least one processor, wherein the at least one processor is configured to: identify a phase offset, identify one of the first phase shifter circuit, the second phase shifter circuit, and the third phase shifter circuit, based on the identified phase offset, and control the apparatus to provide a radio frequency (RF) signal of the input port to a sub-array using the identified phase shifter circuit.

In some embodiments, wherein the reconfigurable phase shifter circuit is further configured as a circuit providing a third phase shift value different from the first phase shift value and the second phase shift value, in a third state.

In some embodiments, further comprising at least one processor, wherein the at least one processor is configured to control the apparatus to transmit a control signal indicating the first state or the second state to the reconfigurable phase shifter circuit.

In some embodiments, wherein the at least one processor is configured to: control the antenna array to radiate a first RF signal applying the first phase shift value through the power divider and the sub-array in the first state, and control the antenna array to radiate a second RF signal applying the second phase shift value through the power divider and the sub-array in the second state.

In some embodiments, wherein a beam width of a first beam formed to radiate the first RF signal is the same as a beam width of a second beam formed to radiate the second RF signal, and a boresight of the first beam and a boresight of the second beam are different.

In some embodiments, wherein the at least one processor is configured to calculate the first phase shift value and the second phase value based on a number of antenna elements in the sub-array, and a number of states operated.

According to an embodiment, an apparatus comprising: at least one processor, an array antenna comprising a sub-array, a power divider and a reconfigurable phase shifter circuit, wherein the at least one processor is configured to: control the antenna array to radiate a first signal based on a first phase shift of the reconfigurable phase shifter circuit and a passive phase shift of the power divider, and control the antenna array to radiate a second signal based on a second phase shift of the reconfigurable phase shifter circuit and a passive phase shift of the power divider, wherein the first phase shift value and the second phase shift value of the reconfigurable phase shifter circuit are configured wherein a boresight of the first signal does not overlap a boresight of the second signal.

In some embodiments, wherein the at least one processor is configured to calculate the first phase shift value and the second phase value based on a number of antenna elements in the sub-array, and a number of states operated.

According to an embodiment, A method of designing an antenna apparatus comprising a phase shifter circuit in which a main path and at least two sub paths are connected in parallel, and a sub-array, the method comprising: setting variables of the main path, setting variables of the at least two sub paths, identifying first values corresponding to the variables of the main path and second values corresponding to the variables of the at least two sub paths based on three conditions and configuring the main path and the at least two sub paths based on the identified first values and second values, wherein the three conditions comprise: a first condition in which a reflection coefficient is 0 based on the main path and the at least two sub paths being connected in parallel, a second condition in which a transmission coefficient is 1 based on the main path and the at least two sub paths being connected in parallel, and a third condition in which a difference of a first phase vector provided based on the main path and a first sub path of the at least two sub paths being connected and a second phase vector provided based on the main path and a second sub path of the at least two sub paths being connected is a designated phase offset.

The methods according to the embodiments described in the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. It may be stored in a memory combining part or all of those recording media. A plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the various embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been illustrated and described with reference to various example embodiments, it will be understood that the various embodiments are intended to be illustrative, not limiting. It will be further understood by one of ordinary skill in the art that various changes may be made without departing from the true spirit and full scope of the disclosure, including the appended claims and their equivalents.

What is claimed is:

1. An antenna apparatus, comprising:
an array antenna comprising a sub-array;
a power divider; and
a reconfigurable phase shifter circuit,
wherein the reconfigurable phase shifter circuit is configured to:
provide a first phase shift value based on a switch, in a first state, and
provide a second phase shift value different from the first phase shift value based on the switch, in a second state,
wherein the reconfigurable phase shifter circuit comprises a first phase shifter circuit including a main path and at least two sub paths comprising a first sub path and a second sub path connected in parallel,
wherein the first phase shifter circuit is configured to connect the first sub path to the main path in the first state, and to connect the second sub path to the main path in the second state.

2. The antenna apparatus of claim 1, wherein the reconfigurable phase shifter circuit is arranged after a port input and before a branch of the power divider.

3. The antenna apparatus of claim 1, wherein a phase provided by the main path provides a fixed value, and
a phase provided to the first sub path and a phase provided to the second sub path are symmetric based on the fixed value.

4. The antenna apparatus of claim 3, wherein a difference of a first phase shift vector provided by the parallel connection of the main path and the first sub path in the first state and a second phase shift vector provided by the parallel connection of the main path and the second sub path in the second state corresponds to a required phase offset.

5. The antenna apparatus of claim 3, wherein a phase value of at least one impedance of the main path, at least one first impedance phase value of the first sub path, and at least one second impedance phase value of the second sub path are determined based on a required phase offset.

6. The antenna apparatus of claim 1, wherein the first sub path or the second sub path comprises at least one of a switch, a diode, or a transistor.

7. The antenna apparatus of claim 1, wherein at least one impedance of the main path and at least one first impedance value of the first sub path are determined to achieve impedance matching, and
at least one impedance of the main path and at least one second impedance value of the second sub path are determined to achieve impedance matching.

8. An antenna apparatus, comprising:
an array antenna comprising a sub-array;
a power divider; and
a reconfigurable phase shifter circuit,
wherein the reconfigurable phase shifter circuit is configured to:
provide a first phase shift value based on a switch, in a first state, and
provide a second phase shift value different from the first phase shift value based on the switch, in a second state,
wherein the reconfigurable phase shifter circuit comprises a second phase shifter circuit having a switched-line structure,
wherein the second phase shifter circuit is configured to:
serially connect a first circuit to an input port and an output port, in the first state, and
serially connect a second circuit to the input port and the output port, in the second state,
wherein the first circuit has an impedance providing the first phase shift value, and
wherein the second circuit has an impedance providing the second phase shift value.

9. The antenna apparatus of claim 8, wherein the reconfigurable phase shifter circuit comprises a third phase shifter circuit having a loaded-line structure,
wherein the third phase shifter circuit is configured to:
connect first phase shift loads in parallel to the main path, the input port and the output port, in the first state based on an operation of the switch,
connect second phase shift loads in parallel to the main path, the input port and the output port, in the second state based on an operation of the switch, and
connect a second circuit to the input port and the output port,
wherein the first circuit has an impedance providing the first phase shift value, and
the second circuit has an impedance providing the second phase shift value.

10. The antenna apparatus of claim 9, further comprising:
at least one processor,
wherein the at least one processor is configured to:
identify a phase offset,
identify one of the first phase shifter circuit, the second phase shifter circuit, and the third phase shifter circuit, based on the identified phase offset, and
control the apparatus to provide a radio frequency (RF) signal of the input port to a sub-array using the identified phase shifter circuit.

11. The antenna apparatus of claim 1, wherein the reconfigurable phase shifter circuit is further configured as a circuit providing a third phase shift value different from the first phase shift value and the second phase shift value, in a third state.

12. An antenna apparatus comprising:
an array antenna comprising a sub-array;
a power divider;
a reconfigurable phase shifter circuit; and
at least one processor,
wherein the reconfigurable phase shifter circuit is configured to:
provide a first phase shift value based on a switch, in a first state, and
provide a second phase shift value different from the first phase shift value based on the switch, in a second state,
wherein the at least one processor is configured to control the apparatus to transmit a control signal indicating the first state or the second state to the reconfigurable phase shifter circuit.

13. The antenna apparatus of claim 12, wherein the at least one processor is configured to:
control the antenna array to radiate a first RF signal applying the first phase shift value through the power divider and the sub-array in the first state, and control the antenna array to radiate a second RF signal applying the second phase shift value through the power divider and the sub-array in the second state.

14. The antenna apparatus of claim 13, wherein a beam width of a first beam formed to radiate the first RF signal is the same as a beam width of a second beam formed to radiate the second RF signal, and a boresight of the first beam and a boresight of the second beam are different.

15. The antenna apparatus of claim 14, wherein the at least one processor is configured to calculate the first phase shift value and the second phase value based on a number of antenna elements in the sub-array, and a number of states operated.

16. An apparatus comprising:
at least one processor;
an array antenna comprising a sub-array;
a power divider; and
a reconfigurable phase shifter circuit,
wherein the at least one processor is configured to:
control the antenna array to radiate a first signal based on a first phase shift of the reconfigurable phase shifter circuit and a passive phase shift of the power divider, and
control the antenna array to radiate a second signal based on a second phase shift of the reconfigurable phase shifter circuit and a passive phase shift of the power divider,
wherein the first phase shift value and the second phase shift value of the reconfigurable phase shifter circuit are configured wherein a boresight of the first signal does not overlap a boresight of the second signal.

17. A method of designing an antenna apparatus comprising a phase shifter circuit in which a main path and at least two sub paths are connected in parallel, and a sub-array, the method comprising:
setting variables of the main path;
setting variables of the at least two sub paths;
identifying first values corresponding to the variables of the main path and second values corresponding to the variables of the at least two sub paths based on three conditions; and
configuring the main path and the at least two sub paths based on the identified first values and second values,
wherein the three conditions comprise:
a first condition in which a reflection coefficient is 0 based on the main path and the at least two sub paths being connected in parallel,
a second condition in which a transmission coefficient is 1 based on the main path and the at least two sub paths being connected in parallel, and
a third condition in which a difference of a first phase vector provided based on the main path and a first sub path of the at least two sub paths being connected and a second phase vector provided based on the main path and a second sub path of the at least two sub paths being connected is a designated phase offset.

* * * * *